United States Patent
Chen

(10) Patent No.: US 11,816,895 B2
(45) Date of Patent: Nov. 14, 2023

(54) TARGET DETECTION METHOD, SYSTEM, AND APPARATUS, STORAGE MEDIUM, AND COMPUTER DEVICE

(71) Applicant: TENCENT TECHNOLOGY (SHENZHEN) COMPANY LIMITED, Shenzhen (CN)

(72) Inventor: Sihong Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 313 days.

(21) Appl. No.: 17/313,241

(22) Filed: May 6, 2021

(65) Prior Publication Data

US 2021/0256266 A1 Aug. 19, 2021

Related U.S. Application Data

(63) Continuation of application No. PCT/CN2020/075048, filed on Feb. 13, 2020.

(30) Foreign Application Priority Data

Mar. 18, 2019 (CN) .......................... 201910204386.0

(51) Int. Cl.
*G06V 20/00* (2022.01)
*G06V 20/40* (2022.01)
(Continued)

(52) U.S. Cl.
CPC ............ *G06V 20/46* (2022.01); *G06F 18/213* (2023.01); *G06F 18/217* (2023.01);
(Continued)

(58) Field of Classification Search
CPC .. G06V 20/46; G06V 10/454; G06V 10/7715; G06V 10/82; G06V 10/776;
(Continued)

(56) References Cited

U.S. PATENT DOCUMENTS

2010/0046830 A1* 2/2010 Wang .................... G06T 7/12
382/164
2018/0214139 A1* 8/2018 Yan ..................... A61B 90/37

FOREIGN PATENT DOCUMENTS

| CN | 102385754 A | 3/2012 |
|---|---|---|
| CN | 108242062 A | 7/2018 |

(Continued)

OTHER PUBLICATIONS

The World Intellectual Property Organization (WIPO) International Search Report for PCT/CN2020/075048 dated May 11, 2020 7 Pages (including translation).

(Continued)

*Primary Examiner* — Michael R Neff
(74) *Attorney, Agent, or Firm* — Anova Law Group, PLLC

(57) ABSTRACT

A target detection method is provided for a computing device. The method includes obtaining a current frame and a previous key frame corresponding to the current frame in a video frame sequence, determining a flow feature map and a flow field between the previous key frame and the current frame, obtaining, in response to determining the current frame is a non-key frame according to the flow feature map, a key frame feature corresponding to the previous key frame, and performing affine transformation on the key frame feature according to the flow field to obtain an image feature corresponding to the current frame, and performing target detection on the current frame according to the image feature to obtain a target detection result of the current frame.

20 Claims, 14 Drawing Sheets

(51) Int. Cl.
*G06F 18/213* (2023.01)
*G06F 18/21* (2023.01)
*G06V 10/77* (2022.01)
*G06V 10/776* (2022.01)
*G06V 10/82* (2022.01)
*G06V 10/44* (2022.01)

(52) U.S. Cl.
CPC .......... *G06V 10/454* (2022.01); *G06V 10/776* (2022.01); *G06V 10/7715* (2022.01); *G06V 10/82* (2022.01); *G06V 2201/03* (2022.01); *G06V 2201/07* (2022.01)

(58) Field of Classification Search
CPC ............ G06V 2201/03; G06V 2201/07; G06F 18/217; G06F 18/213
USPC ........................................................ 382/103
See application file for complete search history.

(56) References Cited

FOREIGN PATENT DOCUMENTS

| CN | 108648746 A | 10/2018 |
| CN | 109271881 A | 1/2019 |
| CN | 109978756 A | 7/2019 |

OTHER PUBLICATIONS

The State Intellectual Property Office of the People's Republic of China (SIPO) Office Action 1 for for 201910204386.0 dated May 22, 2020 11 Pages (including translation).
Xizhou Zhu et al., "Towards High Performance Video Object Detection," Retrieved from the Internet:URL: https://arxiv.org/abs/1711.11577, Nov. 30, 2017 (Nov. 30, 2017). 10 pages.
Congrui Hetang et al., "Impression Network for Video Object Detection," Retrieved from the Internet:URL: https://arxiv.org/abs/1712.05896, Dec. 16, 2017 (Dec. 16, 2017). 10 pages.

* cited by examiner

TARGET DETECTION METHOD, SYSTEM, AND APPARATUS, STORAGE MEDIUM, AND COMPUTER DEVICE

RELATED APPLICATION(S)

This application is a continuation application of PCT Patent Application No. PCT/CN2020/075048, entitled "TARGET DETECTION METHOD, SYSTEM, AND APPARATUS, STORAGE MEDIUM, AND COMPUTER DEVICE" and filed on Feb. 13, 2020, which claims priority to Chinese Patent Application No. 201910204386.0, entitled "TARGET DETECTION METHOD, SYSTEM, AND APPARATUS, STORAGE MEDIUM, AND COMPUTER DEVICE", and filed with the National Intellectual Property Administration, PRC on Mar. 18, 2019, all of which are incorporated herein by reference in entirety.

FIELD OF THE TECHNOLOGY

The present disclosure relates to the field of artificial intelligence technology, and in particular, to a target detection technology.

BACKGROUND

Target detection is one of the hot topics in the field of computer vision research. The computer simulates visual characteristics of human eye and marks a target region in an image or a video through algorithms, to implement the target detection.

According to certain existing methods of performing target detection based on a video, feature extraction may need to be performed on each frame of the video, and then target detection is performed on the video frame based on each extracted image feature, to determine a location of a designated target in each frame and correspondingly mark a detection box. However, features are extracted repeatedly from each frame, which often requires large calculation power and results in low detection efficiency.

SUMMARY

To solve a technical problem of large computation and low detection efficiency of the existing target detection method to a video, the present disclosure in one or more embodiments provides a target detection method, system, and apparatus, a computer-readable storage medium, and a computing device.

One aspect of the present disclosure provides a target detection method performed by a computing device, and the method includes: obtaining a current frame and a previous key frame corresponding to the current frame in a video frame sequence; determining a flow feature map and a flow field between the previous key frame and the current frame; obtaining, in response to determining the current frame is a non-key frame according to the flow feature map, a key frame feature corresponding to the previous key frame, and performing affine transformation on the key frame feature according to the flow field to obtain an image feature corresponding to the current frame; and performing target detection on the current frame according to the image feature to determine a target detection result of the current frame.

Another aspect of the present disclosure provides a target detection method performed by a computing device, and the method includes: obtaining a detection video by performing medical detection on a biological tissue; obtaining a current frame and a previous key frame corresponding to the current frame from a video frame sequence of the detection video; determining a flow feature map and a flow field between the previous key frame and the current frame; obtaining, in response to determining the current frame is a non-key frame according to the flow feature map, a key frame feature corresponding to the previous key frame, and performing affine transformation on the key frame feature according to the flow field to obtain an image feature corresponding to the current frame; and performing target detection on the current frame according to the image feature to determine a detection result corresponding to a lump in the current frame.

Yet another aspect of the present disclosure provides a target detection system, and the system includes: an acquisition device, configured to detect a biological tissue to obtain a detection video; a memory, the memory storing computer-readable instructions; a processor, the computer-readable instructions, when executed by the processor, causing the processor to perform the following operations: obtaining a current frame and a previous key frame corresponding to the current frame from a video frame sequence of the detection video; determining a flow feature map and a flow field between the previous key frame and the current frame; obtaining, in response to determining the current frame is a non-key frame according to the flow feature map, a key frame feature corresponding to the previous key frame, and performing affine transformation on the key frame feature according to the flow field to obtain an image feature corresponding to the current frame; and performing target detection on the current frame according to the image feature to determine a target detection result of the current frame; and a display, configured to display a detection box corresponding to a target in the current frame according to the target detection result.

Yet another aspect of the present disclosure provides a target detection apparatus, and the apparatus includes: an obtaining module, configured to obtain a current frame and a previous key frame corresponding to the current frame in a video frame sequence; a flow calculation module, configured to determine a flow feature map and a flow field between the previous key frame and the current frame; a feature transformation module, configured to obtain, in response to determining the current frame is a non-key frame according to the flow feature map, a key frame feature corresponding to the previous key frame, and perform affine transformation on the key frame feature according to the flow field to obtain an image feature corresponding to the current frame; and a detection module, configured to perform target detection on the current frame according to the image feature to determine a target detection result of the current frame.

Yet another aspect of the present disclosure provides a computer-readable storage medium, storing a computer program, the computer program, when executed by a processor, causing the processor to perform the operations of the foregoing target detection method.

Yet another aspect of the present disclosure provides a computing device, including a memory and a processor, the memory storing a computer program, the computer program, when executed by the processor, causing the processor to perform the operations of the foregoing target detection method.

Yet another aspect of the present disclosure provides a computer program product, including instructions, the instructions, when run on a computer, causing the computer to perform the operations of the foregoing target detection method.

According to the target detection method, system, and apparatus, the computer-readable storage medium, and the computing device, a flow feature map and a flow field between a current frame and a corresponding previous key frame are determined, the flow feature map may represent a similarity between the current frame and the previous key frame, and the flow field may represent motion change information of the current frame relative to the previous key frame. When the current frame is determined to be a non-key frame according to the flow feature map, it indicates that the similarity between the current frame and the previous key frame is relatively high, and affine transformation may be performed on a key frame feature corresponding to the previous key frame according to the flow field to obtain an image feature corresponding to the current frame without feature extraction, which reduces the times of the feature extraction and so as to reduce the calculation amount, thereby improving the detection efficiency of performing target detection on a video. Moreover, the image feature not only retains information about the previous key frame, but also has a feature of the current frame because of the flow field, and therefore, the target detection result obtained by performing target detection on the current frame based on the image feature has higher accuracy.

Other aspects of the present disclosure can be understood by those skilled in the art in light of the description, the claims, and the drawings of the present disclosure.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In one or more embodiments of the present disclosure, the term "based on" is employed herein interchangeably with the term "according to."

Figure 1:
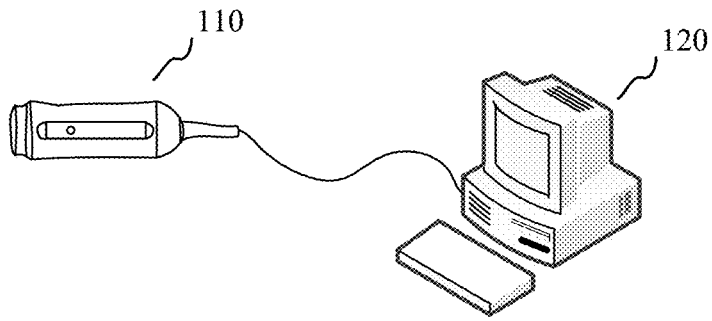
FIG. 1 is a schematic diagram of an implementation environment of a target detection method according to one or more embodiments of the present disclosure.

FIG. 1 is a diagram of an implementation environment of a target detection method according to an embodiment of the present disclosure. Referring to FIG. 1, the target detection method is applicable to a target detection system. The target detection system includes an acquisition device 110 and a computing device 120, and the acquisition device 110 and the computing device 120 may be connected by using a network or a transmission cable. The computing device 120 may alternatively termed a computer device, either of which may be a desktop terminal or a mobile terminal. The mobile terminal may be In certain embodiments at least one of a mobile phone, a tablet computer, a notebook computer, and the like. The computing device 120 may alternatively be a server. The acquisition device 110 may acquire a video in real time and transmit the video to the computing device 120. The computing device 120 may convert the video into a corresponding video frame sequence and obtain a to-be-detected current frame and a previous key frame corresponding to the current frame from the video frame sequence; determine a flow feature map and a flow field between the previous key frame and the current frame; obtain, when or in response to determining the current frame is a non-key frame according to the flow feature map, a key frame feature corresponding to the previous key frame, and perform affine transformation on the key frame feature according to the flow field to obtain an image feature corresponding to the current frame; and perform target detection on the current frame according to the image feature to obtain a target detection result of the current frame.

The foregoing implementation environment is only an example, and in some embodiments, the computing device 120 may directly obtain a video and perform target detection on each video frame in a video frame sequence corresponding to the video according to the foregoing operations.

Figure 2:
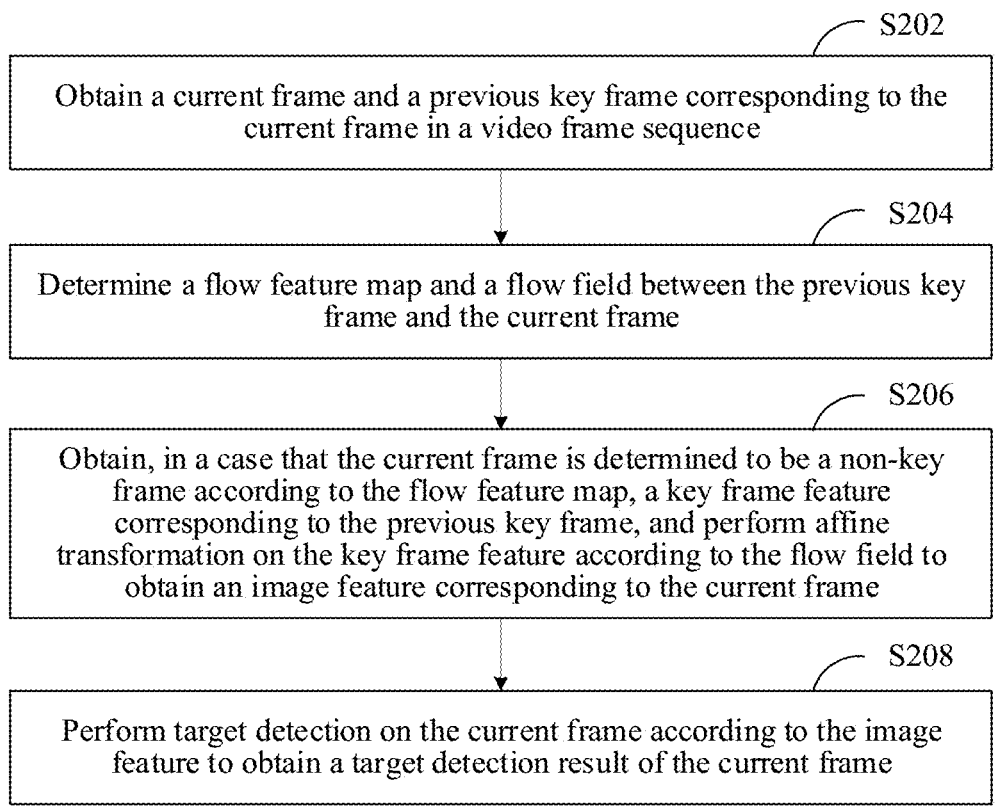
FIG. 2 is a schematic flowchart of a target detection method according to one or more embodiments of the present disclosure.

As shown in FIG. 2, an embodiment of the present disclosure provides a target detection method. In this embodiment, description is made mainly by using an example in which the method is applicable to the computing device 120 in FIG. 1. Referring to FIG. 2, the target detection method in certain embodiments includes the following operations:

S202. Obtain a current frame and a previous key frame corresponding to the current frame in a video frame sequence.

The current frame is a currently-processed video frame. The previous key frame corresponding to the current frame is a closest key frame before the current frame. A key frame in a video frame sequence carries more image information than a non-key frame does. For example, the key frame may be an I-Frame in the video frame sequence. The current frame may be a key frame or a non-key frame, and the non-key frame may be, for example, a P-frame or a B-frame in the video frame sequence. When processing the video frame in the video frame sequence, the previous key frame may be updated into a latest key frame.

In certain embodiments, the computing device may obtain a currently-processed current frame and a previous key frame corresponding to the current frame in a process of detecting the video. In an embodiment, the computing device may set a global variable as the previous key frame, and may only need to update the global variable corresponding to the previous key frame when updating the previous key frame. Accordingly, a video frame represented by the global variable may be directly obtained when obtaining the previous key frame corresponding to the current frame.

In certain embodiments, the "current frame" used in the present disclosure is used for describing a video frame processed in this method, and the "current frame" is a relative variable video frame. For example, when a next video frame of the current frame is processed, the next video frame may be used as a new "current frame".

In an embodiment, after a current frame is detected, if the current frame is the key frame, the computing device uses the current frame as a latest previous key frame. That is, when processing a next video frame, the obtained previous key frame has been updated as a closest key frame before the video frame.

Figure 3:
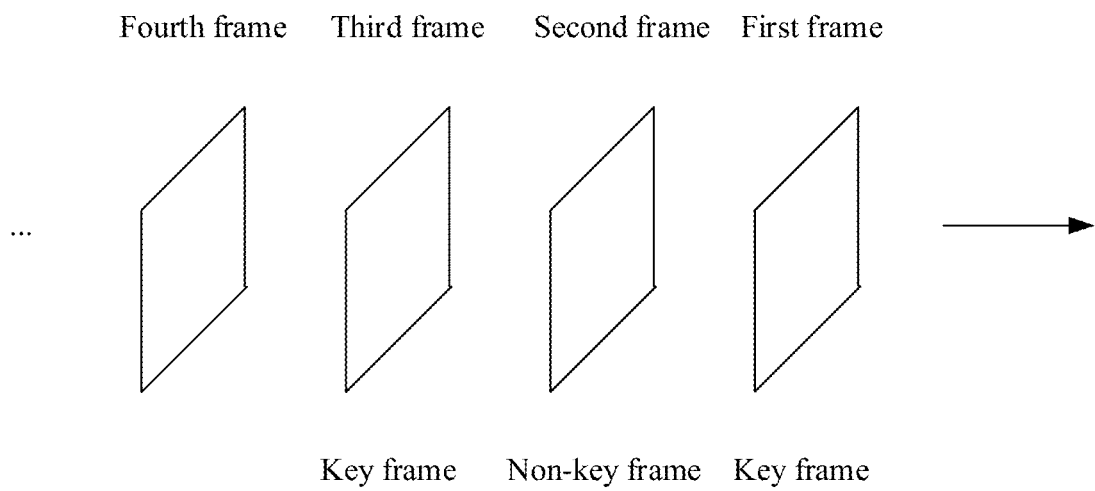
FIG. 3 is a schematic diagram of a video frame sequence according to one or more embodiments of the present disclosure.

FIG. 3 is a schematic diagram of a video frame sequence according to an embodiment. Referring to FIG. 3, in the video frame sequence, the first frame is a key frame, and the second frame is a non-key frame. When processing the third frame, that is, when the third frame is a current frame, a previous key frame corresponding to the third frame is the first frame. If the third frame is also a key frame, when processing the fourth frame, that is, when the fourth frame is a current frame, a previous key frame corresponding to the fourth frame is the third frame.

S204. Determine a flow feature map and a flow field between the previous key frame and the current frame.

The flow feature map may be used for representing a similarity between video frames. The flow feature map between the previous key frame and the current frame may represent the similarity between the previous key frame and the current frame. A higher similarity indicates that a difference between the current frame and the previous key frame is smaller, image information carried in the current frame is generally the same as image information carried in the previous key frame, and the current frame is a non-key frame. On the contrary, a lower similarity indicates that the difference between the current frame and the previous key frame is larger, the image information carried in the current frame is generally different from the image information carried in the previous key frame, and the current frame is also a key frame in a video frame sequence.

The flow field is used for representing a position offset image formed by each pixel in a video frame sequence moving in a video frame, and may represent motion change information between video frames, including motion change information of a to-be-detected target in a video image. The flow field between the previous key frame and the current frame is motion change of each pixel in a current frame relative to a previous key frame. For example, a position of a pixel A in a to-be-detected target region in a video in a previous key frame is (X, Y), and a corresponding position of the pixel A in a current frame is (X', Y'), and therefore, motion change information of the pixel A between the previous key frame and the current frame is a position offset (U, V) of the pixel A from the previous key frame to the current frame, (U, V)=(X', Y')−(X, Y).

In certain embodiments, the computing device may input an obtained current frame and a previous key frame corresponding to the current frame into a pre-trained target detection model, to calculate a flow field and a flow feature map between the current frame and the previous key frame by using the target detection model. The pre-trained target detection model is a network model constructed based on a deep neural network. A model parameter of the target detection model has been trained, and therefore, the target detection model may be directly used to perform target detection on a video.

The term "pre-train" or "pre-trains" or "pre-training" or "pre-trained" may also be understood as "train" or "trains" or "training" or "trained," respectively. In certain embodiments, however, the term "pre-trained" refers to a status of the target detection model that has been trained on image samples previously available.

In an embodiment, the target detection model includes a flow network, and the flow network may be a network structure designed based on FlowNetSimple. A current frame and a previous key frame corresponding to the current frame may be inputted into the flow network in the target detection model, to calculate a flow feature map and a flow field between the previous key frame and the current frame by using the flow network. The inputted video frame may be preprocessed by using the target detection model to obtain an RGB (Red, Green, Blue) component of the inputted video frame, and then a subsequent processing is performed based on the RGB component of the video frame.

Figure 4:
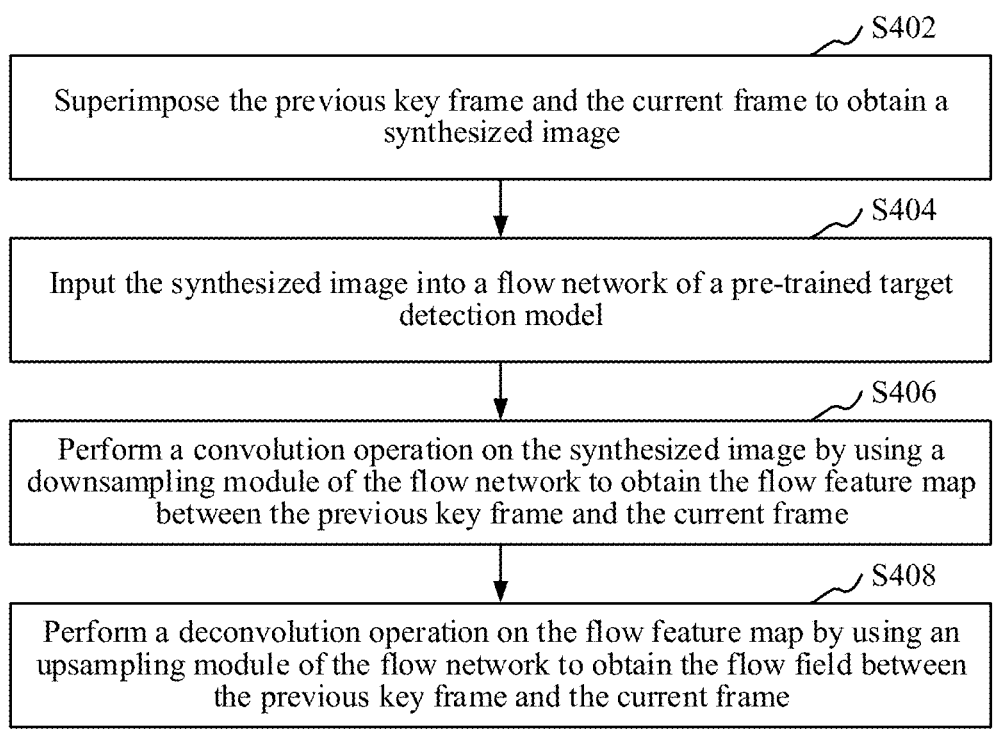
FIG. 4 is a schematic flowchart of an operation of determining a flow feature map and a flow field between a previous key frame and a current frame according to one or more embodiments of the present disclosure.

As shown in FIG. 4, in an embodiment, the operation of determining a flow feature map and a flow field between the previous key frame and the current frame In certain embodiments includes the following operations.

S402. Superimpose the previous key frame and the current frame to obtain a synthesized image.

In certain embodiments, the computing device may concatenate the current frame and the previous key frame to obtain synthesized images of double channel quantities. Both the current frame and the previous key frame may be represented by a pixel matrix of 3 channels, and each channel of the pixel matrix corresponds to an RGB component diagram corresponding to a video frame separately. The computing device may synthesize pixel matrix of the current frame and the previous key frame to obtain a pixel matrix of 6 channels, that is, the synthesized image, and then input the synthesized image into the target detection model. In certain embodiments, the current frame and the previous key frame may be synthesized by using an input layer of the target detection model, to obtain the synthesized image for a subsequent processing by using a middle layer.

For example, both pixel matrix sizes corresponding to the current frame and the previous key frame are w*h*3 (w*h representing a pixel size of the video frame), after the current frame and the previous key frame are superimposed, a pixel matrix with a pixel matrix size being w*h*6 is obtained.

S404. Input the synthesized image into a flow network of a pre-trained target detection model.

In certain embodiments, the computing device may input the obtained synthesized image into the flow network of the target detection model, and the flow network includes a downsampling module and an upsampling module. The flow feature map may be obtained after a convolution operation of the downsampling module is performed on the synthesized image, and the flow field may be obtained after a deconvolution operation of the upsampling module is performed on the flow feature map.

S406. Perform a convolution operation on the synthesized image by using a downsampling module of the flow network to obtain the flow feature map between the previous key frame and the current frame.

The downsampling module includes a plurality of layers of networks, and an output of the downsampling module, that is, the flow feature map, is obtained by inputting the synthesized image into the downsampling module and by using a convolution operation of each layer of network. During the convolution operation, an output of the first layer of network may be used as an input of the second layer of network, and an output of the second layer of network is obtained by using a convolution operation of the second layer of network, and the rest may be deduced by analogy. An output of each layer of network is used as an input of a next layer of network for a subsequent convolution operation, until an output of the last layer of network in the downsampling module is obtained, and the output is used as an output of the entire downsampling module, that is, the flow feature map. In certain embodiments, an output of a middle layer of network in the downsampling module is actually a flow feature map, only information about a similarity between video frames represented by the flow feature map obtained by the middle layer is not comprehensive.

S408. Perform a deconvolution operation on the flow feature map by using an upsampling module of the flow network to obtain the flow field between the previous key frame and the current frame.

The upsampling module includes a plurality of layers of network. After the computing device obtains an output of each layer of network in the downsampling module, the output of each layer of network in the downsampling module is inputted into the upsampling module, and then each layer of network in the upsampling module performs a deconvolution operation on the output to obtain an output of each layer of network in the upsampling module.

In certain embodiments, first, the computing device inputs the output of the last layer of network in the downsampling module, that is, the flow feature map, into the upsampling module to obtain a first type of output by using a deconvolution operation of the first layer of network in the upsampling module. The computing device further performs once convolution operation and deconvolution operation on the flow feature map to obtain a second type of output. Finally, the first type of output, the second type of output, and an output of the penultimate layer of network in the downsampling module are combined or integrated to obtain an output of the first layer of network in the upsampling module. Starting from the second layer of network, an output of the previous layer of network is used as an input, that is, in the second layer of network, an output of the first layer of network is used as an input of the second layer of network, and a first type of output and a second type of output of the second layer of network are obtained by using subsequent processing. Then, the first type of output and the second type of output that are obtained in the second layer of network are combined or integrated with an output of the antepenultimate layer of network in the downsampling module to obtain an output of the second layer of network in the upsampling module. By analogy, until an output of the last layer of network in the upsampling module is obtained, and the output is also used as an output of the entire upsampling module, that is, a flow field. In certain embodiments, an output of a middle layer of network in the upsampling module is also a flow field, only motion change information between video frames represented by the flow field obtained by the middle layer is not comprehensive.

In an embodiment, a network structure table of a flow network designed based on FlowNet is shown in the following Table (1).

TABLE 1

| Network layer name | | Network parameter |
| --- | --- | --- |
| Downsampling module | Conv1 | 7 × 7, 12, stride 2 |
| | Conv2 | 5 × 5, 24, stride 2 |
| | | LeakyReLU |
| | Conv3 | 5 × 5, 48, stride 2 |
| | | LeakyReLU |
| | | 3 × 3, 48 |
| | | LeakyReLU |
| | Conv4 | 3 × 3, 96, stride 2 |
| | | LeakyReLU |
| | | 3 × 3,96 |
| | | LeakyReLU |
| | Conv5 | 3 × 3, 192, stride 2 |
| | | LeakyReLU |
| | | 1 × 1, 192 |
| | | LeakyReLU |
| | Conv6 | 3 × 3, 2 |
| Upsampling module | Deconv5 | 3 × 3, 2 |
| | | 4 × 4, 96deconv, stride 2 |
| | | 4 × 4, 2deconv, stride 2 |
| | Deconv4 | 3 × 3, 2 |
| | | 4 × 4, 48deconv, stride 2 |
| | | 4 × 4, 2deconv, stride 2 |
| | Deconv3 | 3 × 3, 2 |
| | | 4 × 4, 24deconv, stride 2 |
| | | 4 × 4, 2deconv, stride 2 |
| | Deconv2 | 3 × 3, 2 |
| | | 4 × 4, 12deconv, stride 2 |
| | | 4 × 4, 2deconv, stride 2 |
| | Deconv1 | 3 × 3, 2 |
| | | 4 × 4, 96deconv, stride 2 |
| | | 4 × 4, 2deconv, stride 2 |

In the foregoing Table (1), Cony represents a convolutional network; Deconv represents a deconvolution network; LeakyReLU represents an activation function; and the network parameter includes a size of a convolution kernel, a quantity of channels of the convolution kernel, and a stride of a movement of a window in convolution. Using a network parameter (7×7, 12, stride 2) corresponding to Conv1 for description. A size of a convolution kernel of this layer is 7×7, a quantity of channels of the convolution kernel is 12, and a stride is 2.

Figure 5:
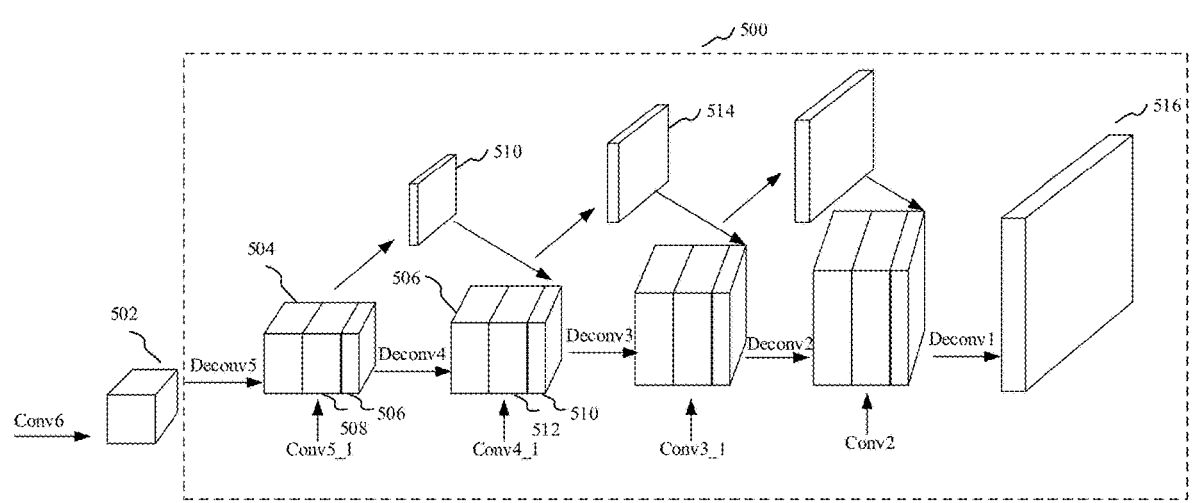
FIG. 5 is a schematic diagram of a network structure corresponding to an upsampling module in a flow network according to one or more embodiments of the present disclosure.

FIG. 5 is a schematic diagram of a network structure corresponding to an upsampling module in a flow network according to an embodiment of the present disclosure. Referring to FIG. 5, an output of the last layer of network Conv6 of the downsampling module, that is, a flow feature map 502, is inputted into an upsampling module 500, and a first type of output 504 is obtained by using a deconvolution operation of the first layer of network Deconv5 in the upsampling module 500, and a second type of output 506 is obtained by performing once convolution operation and once deconvolution operation on the flow feature map 502. Then, an output 508 of the penultimate layer of network Conv5 in the downsampling module is obtained. Finally, the first type of output 504, the second type of output 506, and the output 508 of the penultimate layer of network Conv5 in the downsampling module are combined or integrated to obtain an output 510 of the first layer of network in the upsampling module. Then, the output 510 of the first layer of network, the second type of output 506 of the first layer of network, and an output 512 of the antepenultimate layer of network Conv4 in the downsampling module are combined or integrated to obtain an output 514 of the second layer of network in the upsampling module. By analogy, a final output of the upsampling module, that is, a flow field 516, is obtained.

S206. Obtain, when or in response to determining the current frame is a non-key frame according to the flow feature map, a key frame feature corresponding to the previous key frame, and perform affine transformation on the key frame feature according to the flow field to obtain an image feature corresponding to the current frame.

The key frame feature is obtained by performing feature extraction on the previous key frame, and is a space vector matrix that can represent image information of the previous key frame. The image feature corresponding to the current frame is a space vector matrix that can represent image information of the current frame. The affine transformation is a process of performing linear transformation on a space vector matrix and then performing translation transformation to obtain another space vector matrix. The linear transformation includes a convolution operation.

In certain embodiments, because the flow feature map represents a similarity between video frames, the computing device may determine a difference between the previous key frame and the current frame according to a flow feature map outputted by the flow network, and determine whether the current frame is a key frame according to the difference. If the current frame is a non-key frame, it indicates that the similarity between the current frame and the previous key frame is relatively higher, and the computing device may directly perform affine transformation according to the flow field and the key frame feature to obtain an image feature corresponding to the current frame, that is, transform, according to motion change information between the previous key frame and the current frame, the key frame feature into another feature as the image feature of the current frame.

By obtaining the image feature corresponding to the current frame by using affine transformation, a process of performing feature extraction on the current frame by using a feature extraction network is reduced or even eliminated, and a quantity of times of feature extraction is reduced, thereby saving the computing resource and improving the operation efficiency. Moreover, because the image feature refers to the key frame feature of the previous key frame and combines or integrates the motion change information of the current frame relative to the previous key frame, compared with an image feature obtained by directly performing feature extraction, the image feature further considers the image feature of the previous key frame, and can fully represent the feature of the current frame, which is conducive to improving the accuracy of target detection.

In an embodiment, the operation of obtaining a key frame feature corresponding to the previous key frame, and performing affine transformation on the key frame feature according to the flow field to obtain an image feature corresponding to the current frame includes: obtaining a key frame feature corresponding to the previous key frame; inputting the key frame feature and the flow field into an affine network of a pre-trained target detection model; and performing a convolution operation on the flow field by using the affine network to obtain a flow field having the same size as the key frame feature, and connecting the key frame feature to the flow field having the same size to obtain the image feature corresponding to the current frame.

The affine network is a network used for performing affine transformation on the key frame feature in the target detection model. In certain embodiments, when the current frame is determined to be a non-key frame according to the flow feature map between the previous key frame and the current frame, the computing device may obtain a key frame feature of the previous key frame corresponding to the current frame, that is, the latest key frame feature corresponding to the previous key frame. Then, the computing device inputs the key frame feature and the flow field that is outputted by the flow network and that is between the previous key frame and the current frame into the affine network, performs a convolution operation on the flow field by using the affine network to obtain a flow field having the same size as the key frame feature; and then connects the key frame feature and the flow field after the size adjustment to obtain the image feature corresponding to the current frame.

The same size means that a matrix width of the adjusted flow field is the same as a matrix width of the key frame feature, and a matrix height of the adjusted flow field is also the same as a matrix height of the key frame feature. The connecting the key frame feature to the flow field after the size adjustment means to splice the key frame feature and the flow field after the size adjustment together according to a quantity of channels, to obtain a space vector matrix with more channels. For example, a matrix size of the key frame feature is w*h*c1 (w representing a matrix width, and h representing a matrix height), a matrix size of a flow field that has the same size as the key frame feature and that is obtained by using a convolution operation is w*h*c2, and a matrix size of an image feature corresponding to the current frame after splicing is w*h*(c1+c2).

In an embodiment, to facilitate in performing target detection of pixel level based on the image feature of the current frame and reducing calculation amount, dimension reduction may be alternatively performed on an image feature of a high dimension obtained after the connecting, and a feature obtained after the dimension reduction is used as the image feature corresponding to the current frame. For example, a convolutional network of 1*1*c (c being the same as a quantity of channels of the key frame feature) may be added to the affine network to perform dimension reduction on the image feature obtained by using connection.

In this embodiment, the reason why to connect the key frame feature to an adjusted flow field after adjusting the size of the flow field to be the same as the size of the key frame feature and not to connect the flow field to an adjusted key frame feature after adjusting the size of the key frame feature to be the same as the size of the flow field is that, a quantity of channels of the key frame feature is much more than a quantity of channels of the flow field. If the key frame feature is adjusted, a large quantity of frame information of the previous key frame is lost, and therefore, the image feature of the current frame obtained after the affine transformation is not accurate.

Figure 6:
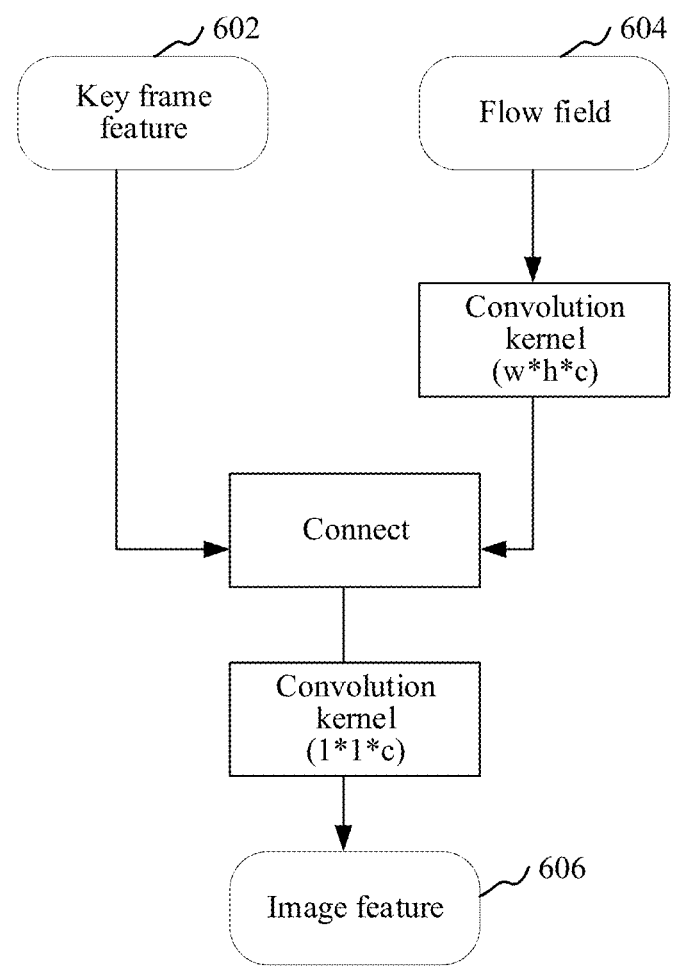
FIG. 6 is a schematic diagram of a network structure of an affine network according to one or more embodiments of the present disclosure.

FIG. 6 is a schematic diagram of a network structure of an affine network according to an embodiment. Referring to FIG. 6, after a key frame feature 602 corresponding to the previous key frame and a flow field 604 are obtained, a convolution operation is performed on the flow field 604 by using a convolution kernel of w*h*c (c being the same as a quantity of channels of the key frame feature) to obtain a flow field having the same size as the key frame feature, and then the key frame feature 602 and the adjusted flow field are connected, and a dimension reduction is performed on the connected feature by using a convolution kernel of (1*1*c), and the obtained feature is used as an image feature 606 corresponding to the current frame.

In the foregoing embodiment, a size of the convolution kernel adopted to perform a convolution operation on the flow field to obtain the flow field having the same size as the key frame feature may be 3*3*c, and a size of the convolution kernel for performing dimension reduction on the connected feature may be 1*1*c, c being the same as the quantity of channels of the key frame feature. In this case, not only the obtained affine network has smaller loss, but also the operation efficiency is higher.

Table (2) shows reference data of relationship between the network structure and the loss of the affine network. Referring to the following Table (2), although a more complex network structure has less loss, using too many convolution kernels sharply increases the network parameter of the affine network, so as to greatly reduce the efficiency. For example, as shown in the last row of combination in Table (2), a size of the design code of the entire method is 1.8 G, but a size of the design code of the entire method when adopting the combination of the first row is only 97 M.

TABLE 2

| Convolution kernel of convolution operation | Convolution kernel of dimension reduction | Loss |
| --- | --- | --- |
| 3 × 3 Conv | 1 × 1 Conv | 0.057 |
| 1 × 1 Conv | 1 × 1 Conv | 0.101 |
| 3 × 3 Conv | 3 × 3 Conv | 0.056 |
| 3 × 3 Conv, 1 × 1 Conv | 1 × 1 Conv | 0.055 |

In an embodiment, the target detection method may further include the following operations:

performing, when or in response to determining the current frame is a key frame according to the flow feature map, feature extraction on the current frame by using a pre-trained feature extraction model to obtain a corresponding image feature, updating the previous key frame according to the current frame, and updating the key frame feature corresponding to the previous key frame according to the image feature.

The feature extraction model is a neural network model for extracting an image feature of a video frame, and the extracted image feature can represent image information of the video frame. The feature extraction model may be a network model obtained based on ResNet design.

In an embodiment, a feature extraction network may be constructed according to a network parameter of the pre-trained feature extraction model, and the feature extraction network is used as a part of the target detection model. In this case, when the current frame is determined to be the key frame, feature extraction may be performed on the current frame by using the feature extraction network in the target detection model, to obtain a corresponding image feature.

In certain embodiments, when the current frame is determined to be the key frame according to the flow feature map, that is, when the similarity between the current frame and the previous key frame is relatively low, the computing device may directly input the current frame into the pre-trained feature extraction model, and obtain the image feature corresponding to the current frame by using processing of the feature extraction model. Moreover, because the current frame is the key frame, the previous key frame is updated, the current frame is used as the latest previous key frame, and the image feature corresponding to the current frame is used as the latest key frame feature. When processing a next frame of the current frame, a previous key frame corresponding to the next frame is the latest key frame feature.

In an embodiment, the network structure of the feature extraction model is shown in Table (3).

TABLE 3

| Network layer name | Network parameter | |
| --- | --- | --- |
| Conv1 | 3 × 3, 64, stride 2 | |
| Conv2_x | 3 × 3 max pool, stride 2 | |
| | 1 × 1, 64 | ×3 blocks |
| | 3 × 3, 64 | |
| | 1 × 1, 256 | |
| Conv3_x | 1 × 1, 128 | ×4 blocks |
| | 3 × 3, 128 | |
| | 1 × 1, 512 | |
| Conv4_x | 1 × 1, 256 | ×6 blocks |
| | 3 × 3, 256 | |
| | 1 × 1, 1024 | |
| Conv5_x | 1 × 1, 512 | ×3 blocks |
| | 3 × 3, 512 | |
| | 1 × 1, 2048 | |
| Conv_new | 1 × 1, 1024 | |

In the foregoing Table (3), Cony represents a convolutional network; Conv_x represents an $x^{th}$ block in a layer of network, for example, Conv2_1 represents the first convolutional network block in Conv2; and the blocks in the foregoing Table (3) represent a quantity of convolutional network blocks of the same network parameter included in the current network layer, for example, Conv2 includes 3 convolutional network blocks, Conv4 includes 6 convolutional network block, and Conv5 includes 3 convolutional network blocks. Both strides of the first blocks of Conv3_x and Conv4_x are 2, and each layer of network is followed by an ReLU layer and a batch normalization layer, the ReLU layer represents an activation function and is used for adding linear relationship between each layer, and the batch normalization layer is used for ensuring standardization of an input of each layer, thereby improving the operation rate.

Figure 7:
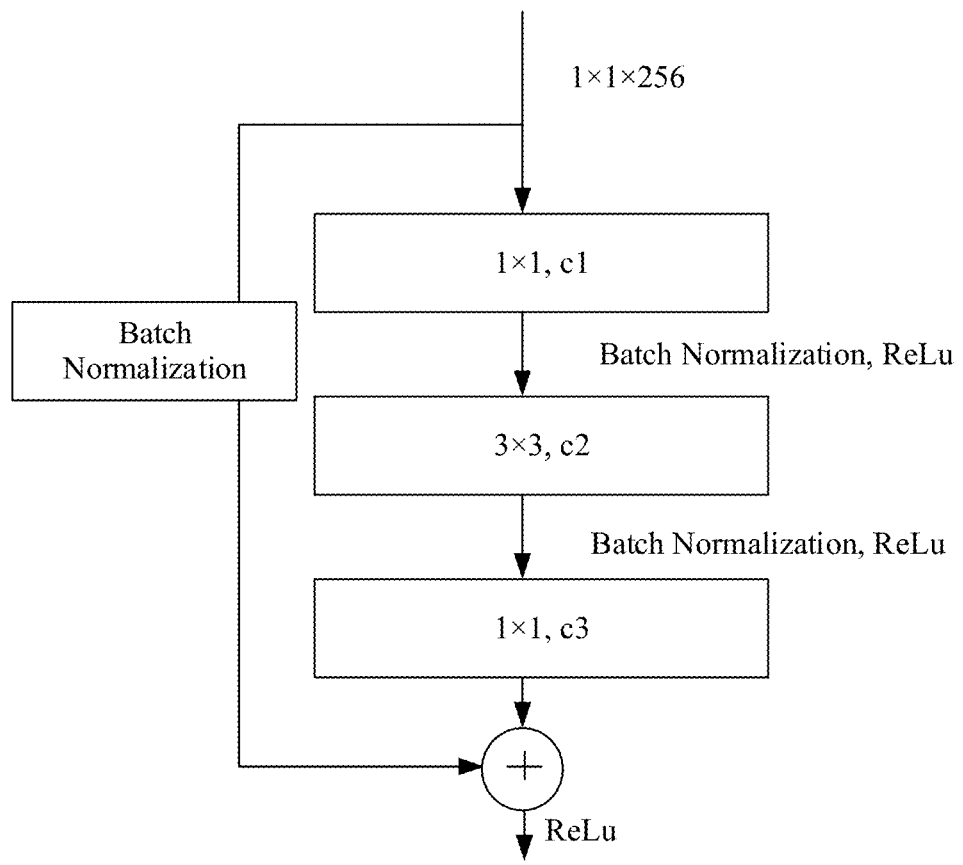
FIG. 7 is a schematic structural diagram of a convolutional network block in each layer of network of a feature extraction model according to one or more embodiments of the present disclosure.

FIG. 7 is a schematic structural diagram of a convolutional network block in each layer of network of a feature extraction model according to an embodiment. Referring to FIG. 7, each convolutional network block includes three convolution kernels of different sizes, a size of the first convolution kernel is 1*1, a size of the second convolution kernel is 3*3, and a size of the third convolution kernel is 1*1. A quantity of channels of convolutional network blocks in each layer of network differs. For example, in Conv2, a matrix size of the first convolution kernel of the convolutional network block is 1*1*64, that is, a quantity of channels is 64, a matrix size of the second convolution kernel is 3*3*64, and a matrix size of the third convolution kernel is 1*1*256. However, in Conv3, a matrix size of the first convolution kernel of the convolutional network block is 1*1*128, a matrix size of the second convolution kernel is 3*3*128, and a matrix size of the third convolution kernel is 1*1*512. The ReLu layer and the batch normalization layer not only exist between each layer of network, the ReLu layer and the batch normalization layer but also exist between each convolutional network block, and between convolution kernels in each convolutional network block.

In an embodiment, the foregoing target detection method may further include the following operations: directly performing, when or in response to determining the current frame is an initial video frame in the video frame sequence, feature extraction on the initial video frame by using a pre-trained feature extraction model to obtain a corresponding image feature, using the initial video frame as the previous key frame, and using the image feature as the key frame feature corresponding to the previous key frame.

In certain embodiments, if the current frame is an initial video frame in the video frame sequence, the computing device uses the initial video frame as the key frame, that is, an initial previous key frame. That is, the image feature corresponding to an initial video frame in the video frame sequence may need to be obtained by performing feature extraction by using the pre-trained feature extraction model, and after the image feature corresponding to the initial video frame is obtained, the initial video frame is used as the previous key frame, and the image feature corresponding to the initial video frame is used as the key frame feature.

In an embodiment, the target detection method further includes an operation of determining whether the current frame is a key frame according to the flow feature map, and the operation In certain embodiments includes: inputting the flow feature map into a decision network of a pre-trained target detection model; performing a convolution operation on the flow feature map by using the decision network to obtain a difference between the previous key frame and the current frame; determining the current frame to be a key frame when or in response to determining the difference is greater than or equal to a preset threshold; and determining the current frame to be a non-key frame when or in response to determining the difference is less than the preset threshold.

The decision network is used for determining whether the current frame is a key frame. An input of the decision network of the target detection model is the flow feature map between the current frame and the previous key frame, and an output is the difference between the current frame and the previous key frame. The difference can reflect the similarity between the current frame and the previous key frame. The computing device may further compare the difference outputted by the flow network with a preset threshold. When the difference is greater than or equal to the preset threshold, the current frame is determined to be a key frame, and when the difference is less than the preset threshold, the current frame is determined to be a non-key frame. The preset threshold may be set as required.

When the difference is greater than or equal to the preset threshold, the computing device is triggered to perform an operation of performing feature extraction on the current frame by using the pre-trained feature extraction model to obtain a corresponding image feature, updating the previous key frame according to the current frame, and updating the key frame feature corresponding to the previous key frame according to the image feature. When the difference is less than the preset threshold, the current frame is determined to be a non-key frame, and the computing device is triggered to perform an operation of obtaining a key frame feature corresponding to the previous key frame, and performing affine transformation on the key frame feature corresponding to the flow field to obtain an image feature corresponding to the current frame.

In an embodiment, when the difference is equal to the preset threshold, the current frame is determined to be a non-key frame, and the previous key frame and the corresponding key frame feature are not required to be updated. Instead, an operation of obtaining a key frame feature corresponding to the previous key frame, and performing affine transformation on the key frame feature according to the flow field to obtain an image feature corresponding to the current frame is triggered.

In an embodiment, the network structure of the decision network includes a convolution layer and two fully connected (FC) layers. The following Table (4) shows a relationship between the network structure of the decision network and the efficiency and the accuracy. Referring to the following Table (4), because a quantity of channels of the flow feature map is relatively large, the design of the decision network is to be as simple as possible to improve the efficiency. When the decision network includes one convolutional layer and two FC layers, the performance of the decision network is better.

TABLE 4

| Network structure of decision network | Determining time of decision network (ms) | Error rate (percentage) |
| --- | --- | --- |
| 1 × Conv + 1 × Fc | 0.45 | 2.60 |
| 1 × Conv + 2 × Fc | 1.09 | 1.96 |
| 1 × Conv + 3 × Fc | 1.99 | 1.85 |
| 1 × Conv + 4 × Fc | 2.50 | 1.76 |

S208. Perform target detection on the current frame according to the image feature to obtain a target detection result of the current frame.

The target detection result may be a target region formed by pixel belonging to target in the current frame, or may be a target region detection box corresponding to the target region, and the target region detection box may be a smallest box surrounding the target region.

In certain embodiments, after the image feature corresponding to the current frame is obtained through the processing of the target detection model, the computing device may perform target detection of pixel level on the current frame, that is, detect a pixel level of each pixel in the current frame based on the image feature of the current frame, to output a detection result corresponding to the target in the current frame. As described above, when the current frame is a non-key frame, the image feature of the current frame is obtained by performing affine transformation on the key frame feature. When the current frame is a key frame, the image feature of the current frame is obtained by using direct feature extraction. In an embodiment, the computing device may perform target detection on the image feature of the current frame by using a pre-trained pixel level classifier, to output a detection result corresponding to the target in the current frame.

In an actual implementation, in addition to implementing target detection by detecting the pixel level of each pixel in the current frame, the computing device may alternatively implement target detection on the current frame by using another target detection algorithm, and the adopted target detection algorithm is not limited in the present disclosure.

In an embodiment, the performing target detection on the current frame according to the image feature to determine a target detection result of the current frame includes: inputting the image feature corresponding to the current frame into a pixel level classifier; performing pixel level prediction on the image feature by using a hidden layer of the pixel level classifier to obtain a pixel level of each pixel in the current frame; and determining the target detection result of the current frame according to the pixel level of each pixel in the current frame.

The pixel level classifier is a machine learning model for predicting a pixel level of each pixel in a video frame. The image feature corresponding to the current frame is inputted into the pixel level classifier, and the image feature is processed by using the hidden layer of the pixel level classifier, to obtain the pixel level of each pixel in the current frame. For example, a pixel level of a pixel belonging to the target in the current frame is 1, and a pixel level of a pixel not belonging to the target is 0, and therefore, a region formed by all pixels with pixel levels being 1 in the current frame is the target region. A smallest detection box corresponding to the target region may be determined according to pixel coordinates of each pixel in the target region, and the smallest detection box is used as the target detection result.

In an embodiment, the computing device may display a detection box corresponding to a target region in a video frame according to a target detection result of each video frame, thereby tracking the target in a video formed by continuous video frames.

According to the target detection method, a flow feature map and a flow field between a current frame and a corresponding previous key frame are extracted, the flow feature map may represent a similarity between the current frame and the previous key frame, and the flow field may represent motion change information of the current frame relative to the previous key frame. When the current frame is determined to be a non-key frame according to the flow feature map, it indicates that the similarity between the current frame and the previous key frame is high, and affine transformation may be performed on a key frame feature corresponding to the previous key frame according to the flow field to obtain an image feature corresponding to the current frame without feature extraction, which reduces the times of the feature extraction and so as to reduce the calculation amount, thereby improving the detection efficiency of performing target detection on a video. Moreover, the image feature not only retains information about the previous key frame, but also has a feature of the current frame because of the flow field, and therefore, the target detection result obtained by performing target detection on the current frame based on the image feature has higher accuracy.

Figure 8:
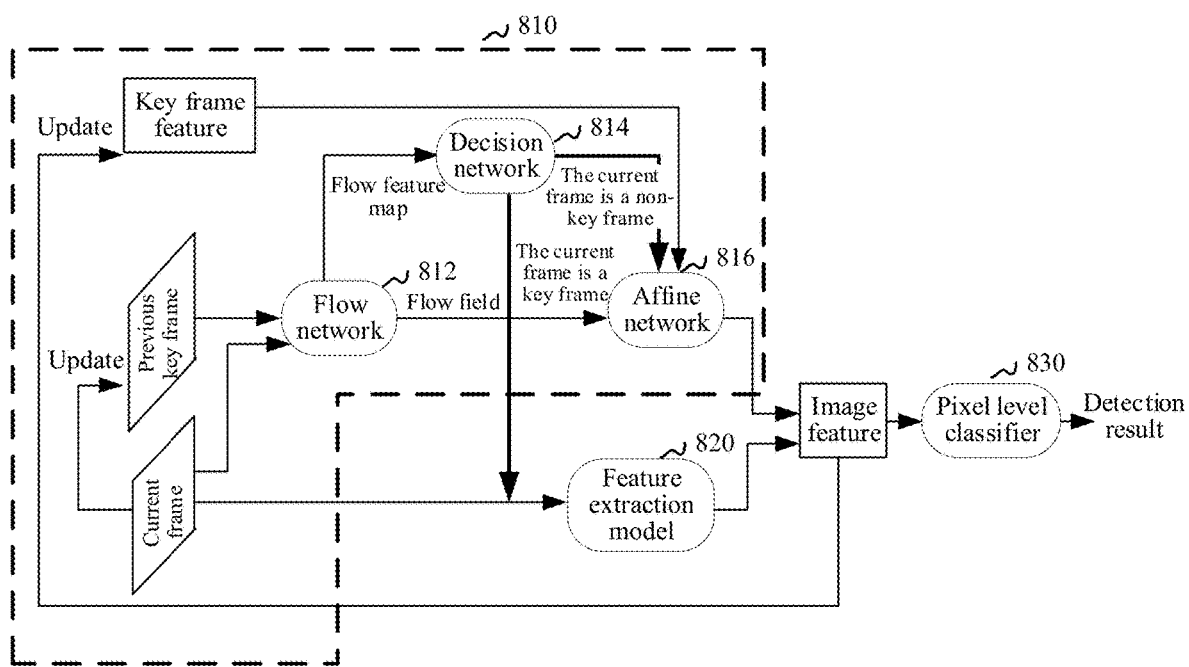
FIG. 8 is a general framework of a target detection method according to one or more embodiments of the present disclosure.

FIG. 8 is a general framework of a target detection method according to an embodiment. Referring to FIG. 8, the general framework includes a target detection model 810, a feature extraction model 820, and a pixel level classifier 830.

The target detection model 810 includes a flow network 812, a decision network 814, and an affine network 816.

When target detection is performed on the target in the video, each video frame in a video frame sequence is inputted frame by frame. If the current frame is an initial video frame, the initial video frame is used as a key frame, and feature extraction is directly performed on the current frame by using the feature extraction model 820 to obtain a corresponding image feature. The current frame is used as the latest previous key frame, and the image feature is used as the latest key frame feature.

Starting from the second video frame, whether the current frame is a key frame may need to be determined by using the following operations: inputting the current frame and the corresponding previous key frame into the flow network 812; outputting a flow feature map and a flow field by using the flow network 812; inputting the flow feature map into the decision network 814; outputting a difference between the current frame and the latest previous key frame by using the decision network 814; and comparing the difference with a preset threshold to determine whether the current frame is a key frame. If the current frame is the key frame, the feature extraction is directly performed by using the feature extraction model 820, to obtain the image feature corresponding to the current frame and update the previous key frame and the key frame feature. If the current frame is the non-key frame, the key frame feature of the previous key frame corresponding to the current frame and the flow field between the current frame and the previous key frame are inputted into the affine network 816, and the image feature corresponding to the current frame is outputted by using affine transformation of the affine network 816. Finally, the obtained image feature is inputted into the pixel level classifier 830 for target detection of pixel level, to output a target detection result of the current frame. By analogy, a next video frame of the current frame is processed.

In an embodiment, the video frame sequence is a detection video obtained by performing medical detection on a biological tissue, for example, may be a breast ultrasonic detection video. A target in the video frame is a lump, and a detection result is a detection box corresponding to the lump in the video frame.

Figure 9:
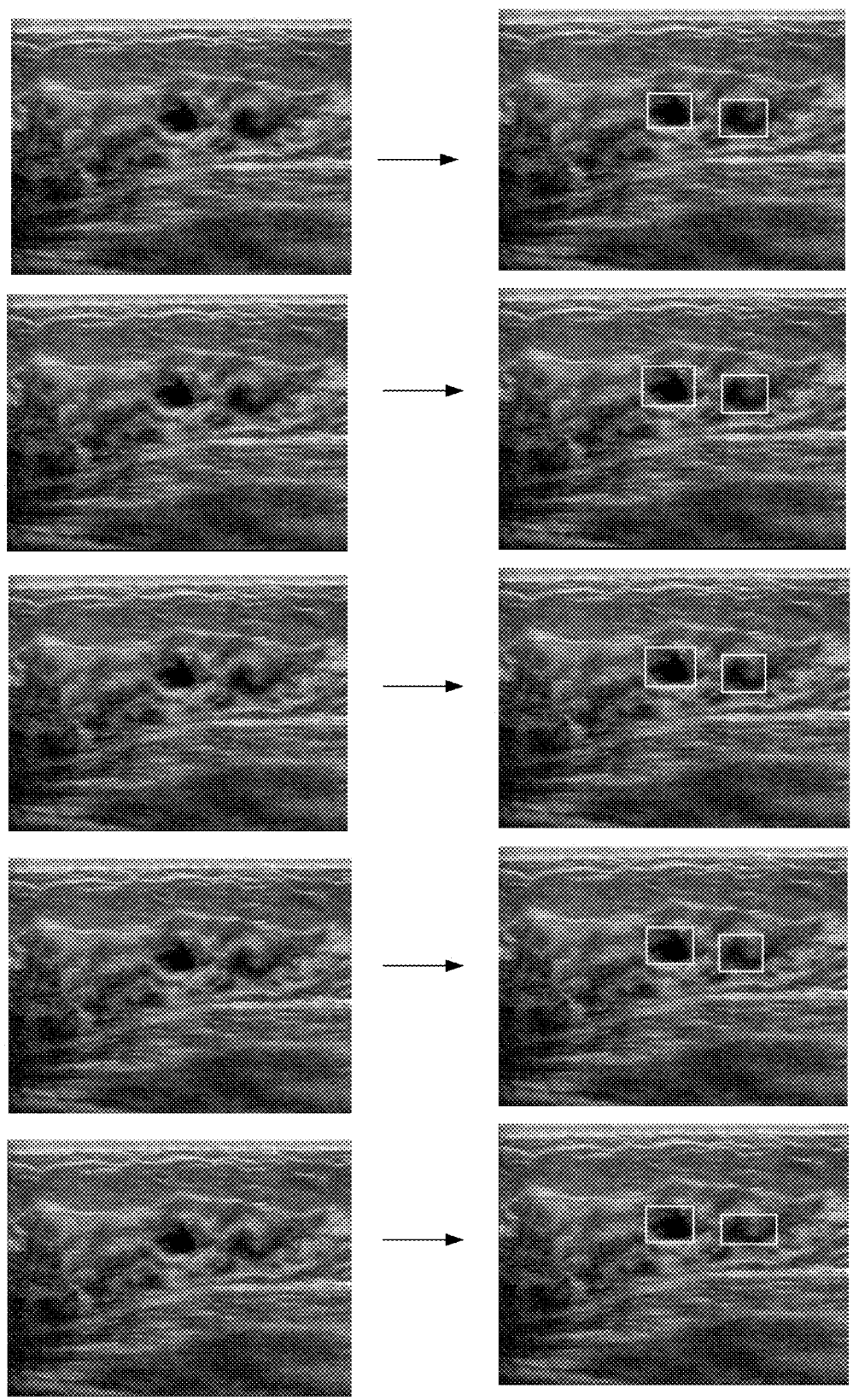
FIG. 9 is a schematic diagram of a detection result obtained by performing target detection on a lump in a breast ultrasonic detection video according to one or more embodiments of the present disclosure.

FIG. 9 is a schematic diagram of a detection result obtained by performing target detection on a lump in a breast ultrasonic detection video according to an embodiment of the present disclosure. Referring to FIG. 9, target detection is performed on the breast ultrasonic detection video, and a lump region may be detected and a detection box corresponding to the lump may be displayed, thereby tracking the lump in the breast ultrasonic detection video.

Figure 10:
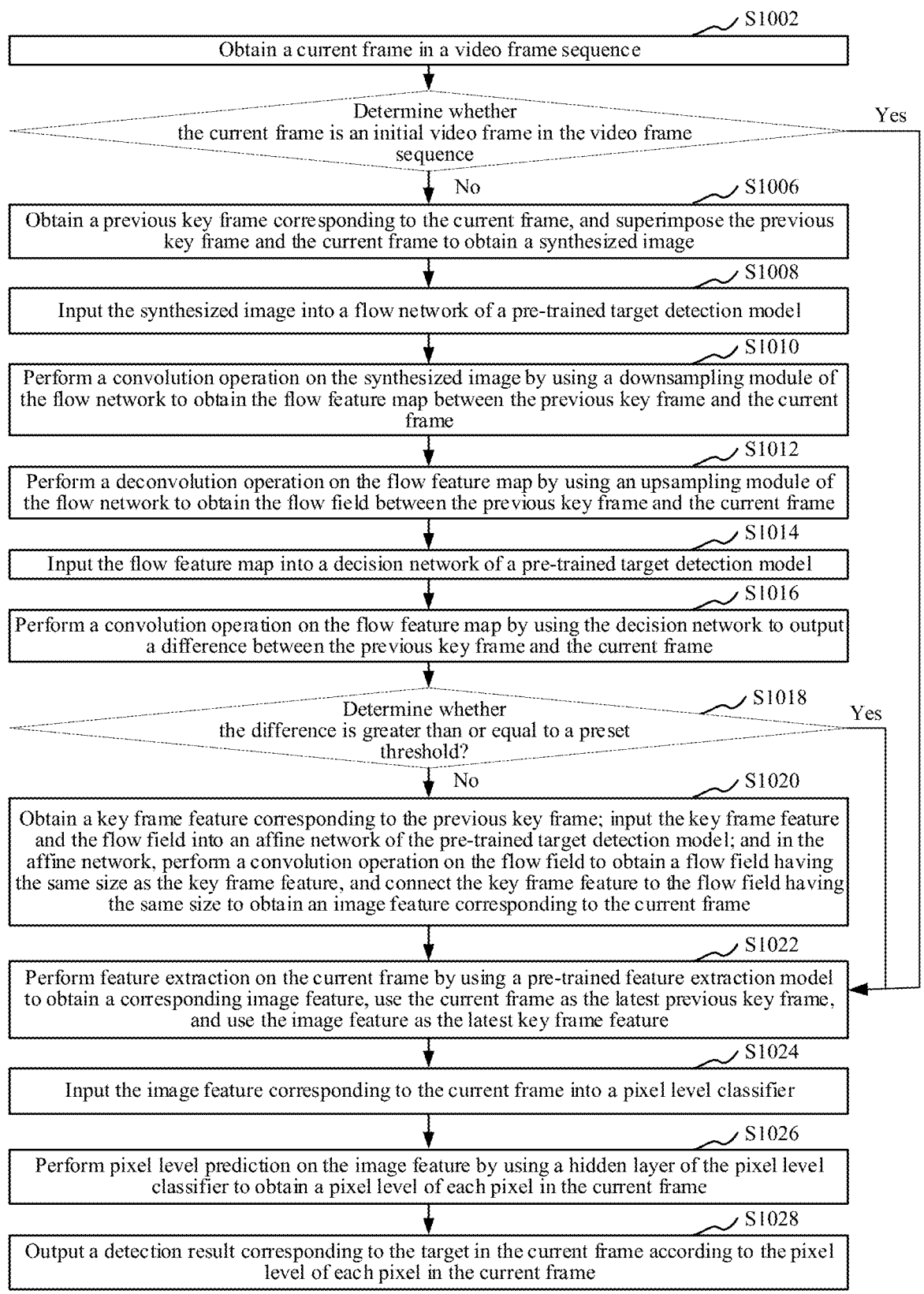
FIG. 10 is a schematic flowchart of a target detection method according to one or more embodiments of the present disclosure.

FIG. 10 is a schematic flowchart of a target detection method according to a specific embodiment. Referring to FIG. 10, the method In certain embodiments includes the following operations.

S1002. Obtain a current frame in a video frame sequence.

S1004. Determine whether the current frame is an initial video frame in the video frame sequence; perform step S1022 if the current frame is the first video frame; and perform step S1006 if the current frame is not the first video frame.

S1006. Obtain a previous key frame corresponding to the current frame, and superimpose the previous key frame and the current frame to obtain a synthesized image.

S1008. Input the synthesized image into a flow network of a pre-trained target detection model.

S1010. Perform a convolution operation on the synthesized image by using a downsampling module of the flow network to obtain a flow feature map between the previous key frame and the current frame.

S1012. Perform a deconvolution operation on the flow feature map by using an upsampling module of the flow network to obtain a flow field between the previous key frame and the current frame.

S1014. Input the flow feature map into a decision network of a pre-trained target detection model.

S1016. Perform a convolution operation on the flow feature map by using the decision network to output a difference between the previous key frame and the current frame.

S1018. Determine a size relationship between the difference and a preset threshold; perform S1022 when the difference is greater than or equal to the preset threshold; and perform S1020 when the difference is less than the preset threshold.

S1020. Obtain a key frame feature corresponding to the previous key frame; input the key frame feature and the flow field into an affine network of the pre-trained target detection model; and perform a convolution operation on the flow field by using the affine network to obtain a flow field having the same size as the key frame feature, and connect the key frame feature to the flow field having the same size to obtain an image feature corresponding to the current frame.

S1022. Perform feature extraction on the current frame by using a pre-trained feature extraction model to obtain a corresponding image feature, update the previous key frame according to the current frame, and update the key frame feature corresponding to the previous key frame according to the image feature.

S1024. Input the image feature corresponding to the current frame into a pixel level classifier.

S1026. Perform pixel level prediction on the image feature by using a hidden layer of the pixel level classifier to obtain a pixel level of each pixel in the current frame.

S1028. Output a detection result corresponding to the target in the current frame according to the pixel level of each pixel in the current frame.

According to the target detection method, a flow feature map and a flow field between a current frame and a corresponding previous key frame are extracted, the flow feature map may represent a similarity between the current frame and the previous key frame, and the flow field may represent motion change information of the current frame relative to the previous key frame. When the current frame is determined to be a non-key frame according to the flow feature map, it indicates that the similarity between the current frame and the previous key frame is relatively high, and affine transformation may be performed on a key frame feature corresponding to the previous key frame according to the flow field to obtain an image feature corresponding to the current frame without feature extraction, which reduces the times of the feature extraction and so as to reduce the calculation amount, thereby improving the detection efficiency of performing target detection on a video. Moreover, the image feature not only retains information about the previous key frame, but also has a feature of the current frame because of the flow field, and therefore, the target detection result obtained by performing detection on the pixel level of each pixel in the current frame based on the image feature has higher accuracy.

FIG. 10 is a schematic flowchart of a target detection method according to an embodiment. In certain embodiments, although different steps in the flowchart of FIG. 10 are displayed in sequence as indicated by arrows, these steps are not necessarily performed in sequence in the order indicated by the arrows. Unless otherwise explicitly specified in the present disclosure, execution of the steps is not strictly limited, and the steps may be performed in other sequences. In addition, at least some steps in FIG. 10 may include a plurality of substeps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of the another step.

Figure 11:
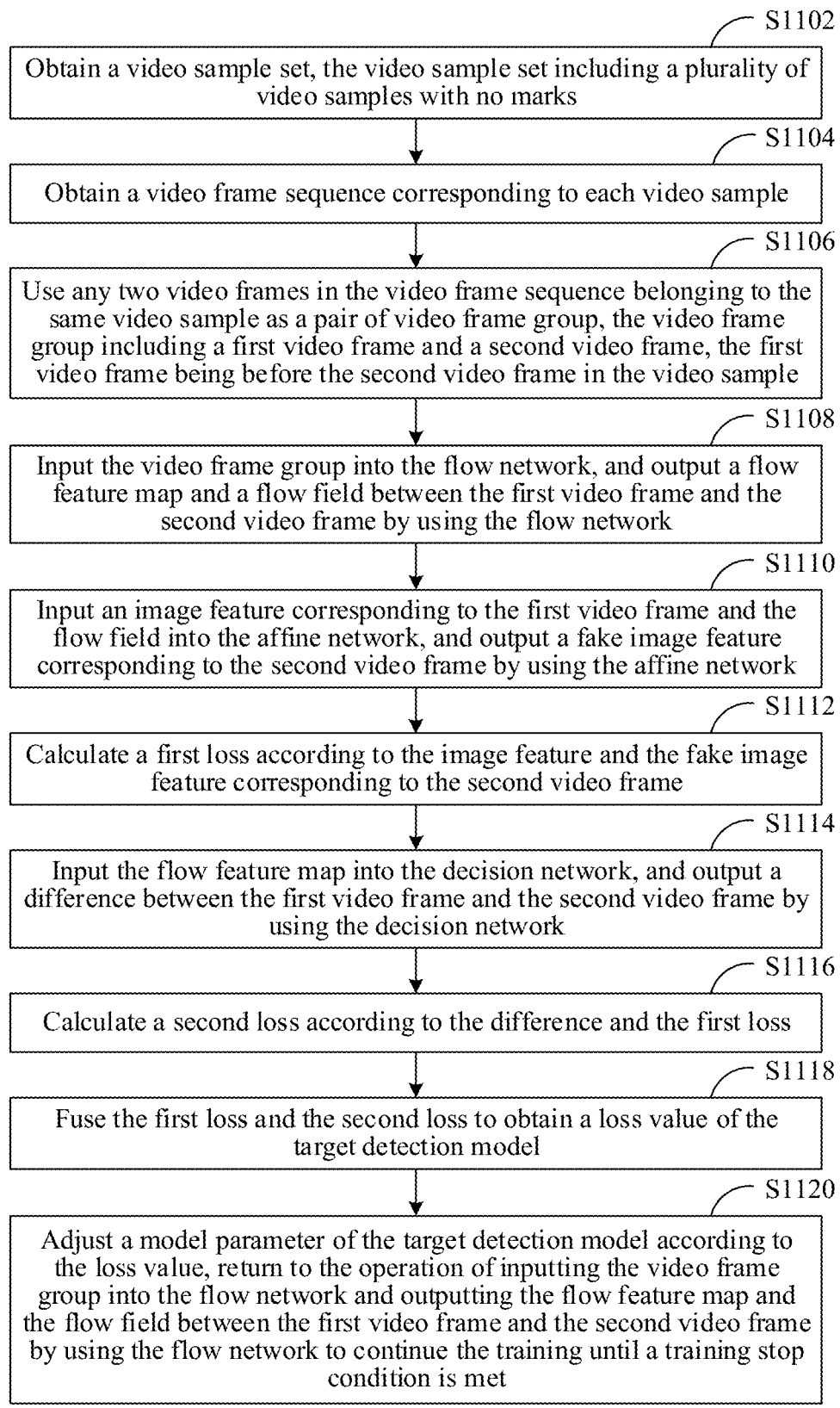
FIG. 11 is a schematic flowchart of operations of training a target detection model according to one or more embodiments of the present disclosure.

As shown in FIG. 11, a target detection model in this embodiment of the present disclosure includes a flow network, a decision network, and an affine network, and operations of training the target detection model includes the following operations.

S1102. Obtain a video sample set, the video sample set including a plurality of video samples with no marks.

A video image in the video sample includes a to-be-detected target. The video sample with no marks means that the video sample does not include mark data corresponding to the to-be-detected target. The mark data may be pixel coordinate data of a detection box corresponding to the to-be-detected target.

The term "to-be-detected target" or "target" may also be understood as a target of interest, a feature of interest, or an area of interest. In certain embodiments, the term "to-be-detected target" or "target" refers to a target on an image that is subject to one or more steps referenced in the accompanying drawings.

For example, the video sample set may be a sample set formed by a plurality of breast ultrasonic detection videos with no marks, and a video image of the breast ultrasonic detection video includes a lump region.

S1104. Obtain a video frame sequence corresponding to each video sample.

In certain embodiments, the computing device may need to process the video sample with no marks into a single frame of image, to obtain a video frame sequence corresponding to each video sample.

S1106. Use any two video frames in the video frame sequence belonging to the same video sample as a pair of video frame group, the video frame group including a first video frame and a second video frame, the first video frame being before the second video frame in the video sample.

In certain embodiments, any two video frame groups of the same video sample are a pair of video frame group, and the video frame group is training data of a flow network and a decision network in the target detection model. One video frame in the video frame group is the first video frame, and is corresponding to a previous key frame required to be processed in an implementation process of the target detection model. The other video frame is the second video frame, and is corresponding to a current frame required to be processed in an implementation process of the target detection model. The any two video frames selected from the video frame sequence belonging to the same video sample may be randomly-selected video frames. In this case, not only diversified flow information may be recognized by the decision network, but also the video sample set is increased.

S1108. Input the video frame group into the flow network, and output a flow feature map and a flow field between the first video frame and the second video frame by using the flow network.

In certain embodiments, the inputting an obtained video frame group into the flow network is actually to superimpose a first video frame and a second video frame in the video frame group to obtain a synthesized image, and then to input the synthesized image into the flow network, to output a flow feature map and a flow field between the first video frame and the second video frame in the video frame group by using the flow network. Before the training of the target detection model is performed, a flow feature map and a flow field outputted by the flow network is not very accurate.

S1110. Input an image feature corresponding to the first video frame and the flow field into the affine network, and output a fake image feature corresponding to the second video frame by using the affine network.

In certain embodiments, before the training of the target detection model is performed, a network parameter of the affine network is not determined. Therefore, the image feature of the second video frame outputted by using the affine network is a fake image feature, not a true image feature.

S1112. Calculate a first loss according to the image feature and the fake image feature corresponding to the second video frame.

The image feature corresponding to the second video frame is a true image feature, and is obtained through feature extraction of a pre-trained feature extraction model. The first loss (Loss 1) obtained through calculation according to the image feature and the fake image feature corresponding to the second video frame can reflect the accuracy of the flow network and the affine network.

Before training a target detection model, a feature extraction model may need to be trained by using a marked image including a target, to obtain a pre-trained feature extraction model, then image features respectively corresponding to the first video frame and the second video frame are determined by using the pre-trained feature extraction model, and further the target detection model is trained based on the image features respectively corresponding to the first video frame and the second video frame.

In an embodiment, the foregoing training method further includes: inputting the first video frame into the pre-trained feature extraction model, and performing an operation on the first video frame by using the feature extraction model to output the image feature corresponding to the first video frame; and inputting the second video frame into the pre-trained feature extraction model, and performing an operation on the second video frame by using the feature extraction model to output the image feature corresponding to the second video frame.

In an embodiment, the foregoing training method further includes an operation of training a feature extraction model in advance to obtain a pre-trained feature extraction model, including: obtaining an image sample set, each image sample in the image sample set being marked with a corresponding true detection box, the true detection box being capable of boxing a region in which a target is located in the image sample; inputting the image sample into a feature extraction model for training, to obtain a predicted detection box corresponding to the target included in the image sample; constructing a loss function according to the true detection box and the predicted detection box; and adjusting a model parameter of the feature extraction model according to the loss function, obtaining a next image sample from the image sample set, and returning to the operation of inputting the image sample into the feature extraction model for training to continue the training until a training stop condition is met.

Each image sample in the image sample set is a marked image sample, that is, during training the feature extraction model, the computing device obtains a true detection box corresponding to the image sample, that is, a detection result corresponding to a target in the image sample, and trains the feature extraction model according to the true detection result.

The feature extraction model is pre-trained, and therefore, the target detection model may be adapted to a plurality of different types of feature extraction models, and a designer of the target detection model may select a corresponding feature extraction network to construct a feature extraction model according to the difficulty of a target detection task.

S1114. Input the flow feature map into the decision network, and output a difference between the first video frame and the second video frame by using the decision network.

In certain embodiments, the computing device continues to input the flow field outputted by the flow network into the decision network, and outputs the difference between two video frames in the video frame group by using the decision network. Similarly, before the training of the target detection model is performed, the difference obtained by using the decision network is not accurate.

S1116. Calculate a second loss according to the difference and the first loss.

In certain embodiments, the second loss (Loss 2) obtained by calculating a loss between the difference obtained in step S1114 and the first loss obtained in step S1112 can reflect the accuracy of the flow network and the decision network.

S1118. Fuse the first loss and the second loss to obtain a loss value of the target detection model.

In certain embodiments, the loss value of the target detection model may be calculated by using the following formula:

Loss=$n$*Loss 1+Loss 2, $n$ being a weight parameter.

Because the second loss (Loss 2) and the first loss (Loss 1) are correlated, and a size of the second loss is greatly correlated to that of the first loss. To obtain a more accurate loss value, n may be 0.1 to 0.5.

S1120. Adjust a model parameter of the target detection model according to the loss value, return to the operation of inputting the video frame group into the flow network and outputting the flow feature map and the flow field between the first video frame and the second video frame by using the flow network to continue the training until a training stop condition is met.

Figure 12:
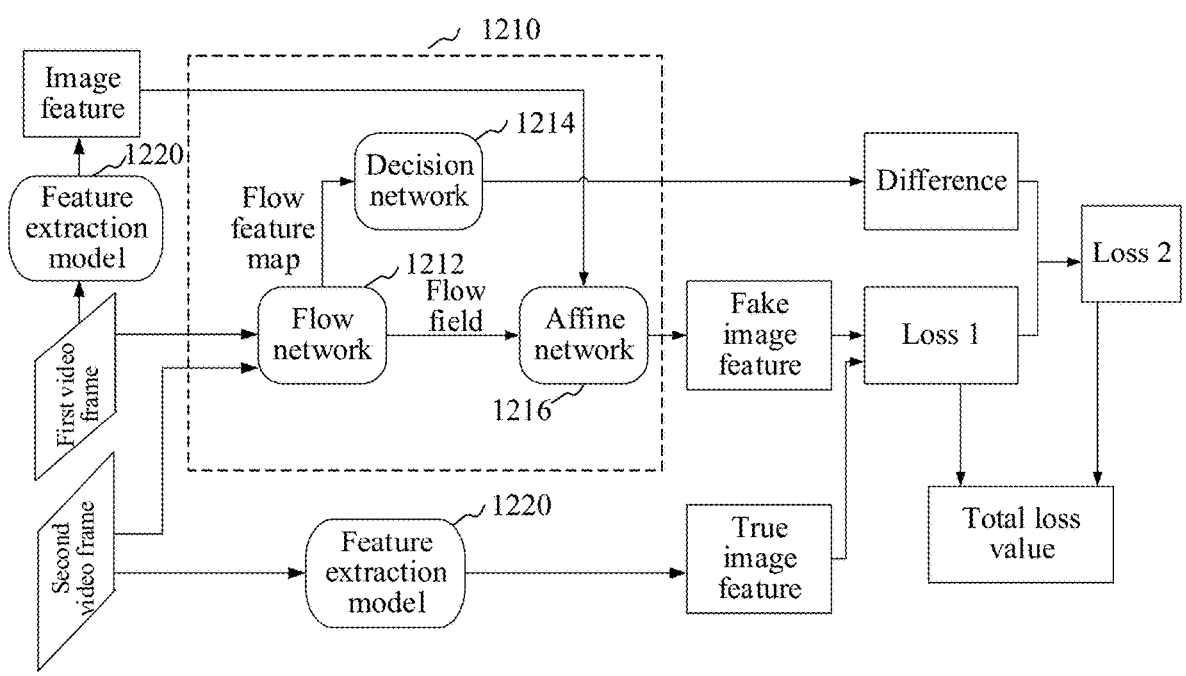
FIG. 12 is a block flowchart of training a target detection model according to one or more embodiments of the present disclosure.

FIG. 12 is a block flowchart of training a target detection model according to an embodiment. Referring to FIG. 12, a to-be-trained target detection model 1210 includes a flow network 1212, a decision network 1214, and an affine network 1216. After a feature extraction model 1220 is trained, a pair of video frame group (including a first video frame and a second video frame) into the flow network 1212. A flow feature map and a flow field between the first video frame and the second video frame are outputted by using the flow network 1212. Then, an image feature (a true image feature obtained through feature extraction of the pre-trained feature extraction model 1220) and the flow field of the first video frame are inputted into the affine network 1216 A fake image feature corresponding to the second video frame is outputted by using the affine network 1216. Feature extraction is performed on the second video frame by using the feature extraction model 1220 to obtain a true image feature. A first loss (Loss 1) is obtained according to a difference between the fake image feature and the true image feature of the second video frame. Then, the flow feature map may further be needed to be inputted into the decision network 1214, and a second loss (Loss 2) is obtained by calculating a loss between the difference determined by the decision network 1214 and the first loss. The loss of the entire target detection model may be calculated according to the first loss and the second loss.

In this embodiment, the video sample does not have mark data, that is, mark data of a video is not used, and instead, a video sample with no marks and a pre-trained feature extraction model are used to train the target detection model, thereby obtaining a target detection model with good accuracy and operation efficiency.

According to the target detection method provided in the embodiments of the present disclosure, the designed feature extraction model may be designed based on ResNet50. The following Table (5) shows performance data when performing target detection according to the target detection method provided in the present disclosure in the related technology.

Figure 13:
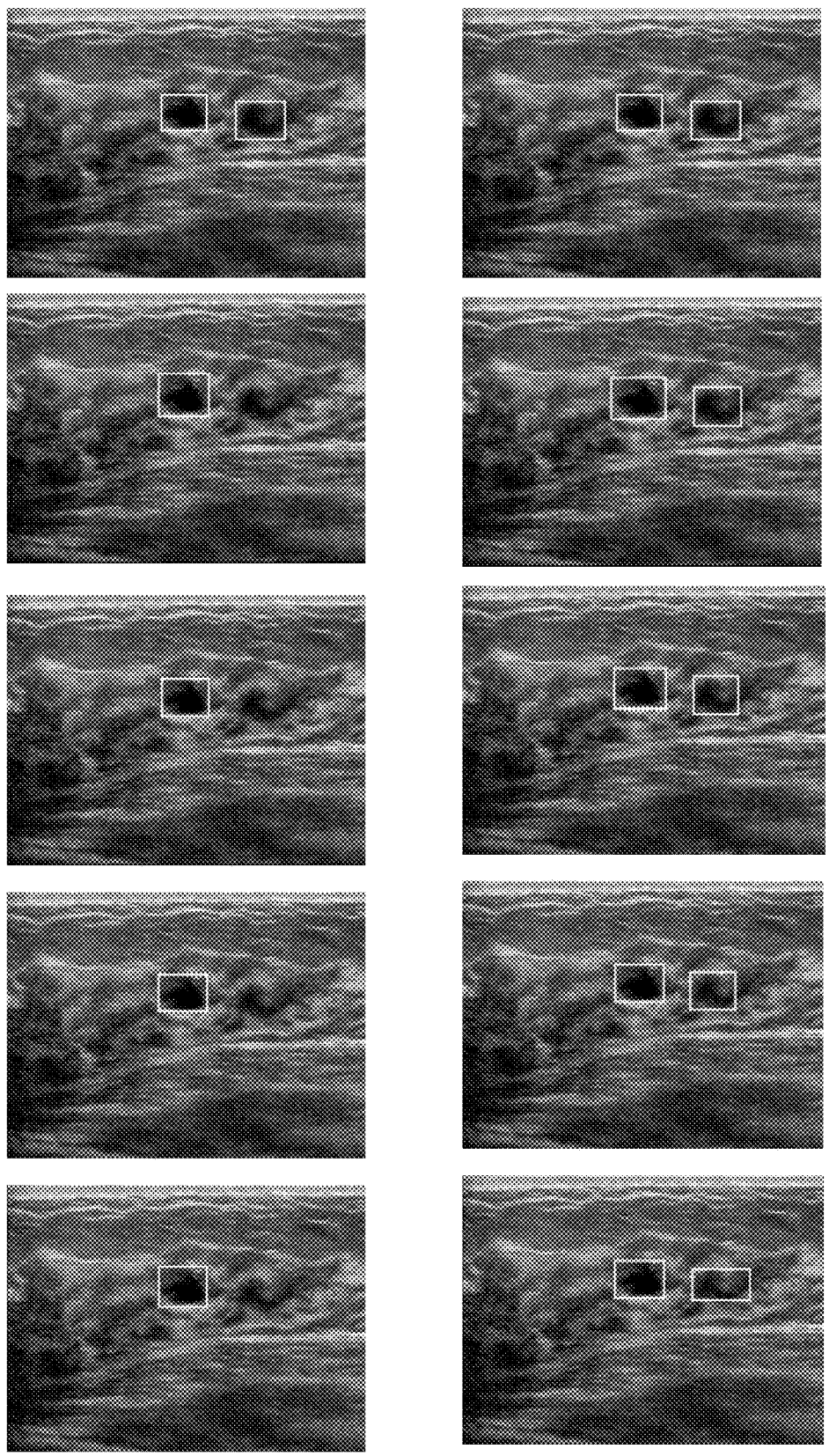
FIG. 13 is a schematic diagram used for representing a comparison of improved accuracies of a target detection method provided in the embodiments of the present disclosure according to one or more embodiments of the present disclosure.

FIG. 13 is a schematic diagram of a comparison of improved accuracies of a target detection method provided in the embodiments of the present disclosure. The first column in FIG. 13 shows a detection result of a breast ultrasonic detection video in the related technology, it may be seen that because frame information of a previous key frame is not considered, from the second frame of image to the fifth frame of image, a lump at the right of the image is not detected. The second column in FIG. 13 may continuously track the lump at the right of the image by using the target detection method provided in the embodiments of the present disclosure, and the accuracy is greatly improved.

Figure 14:
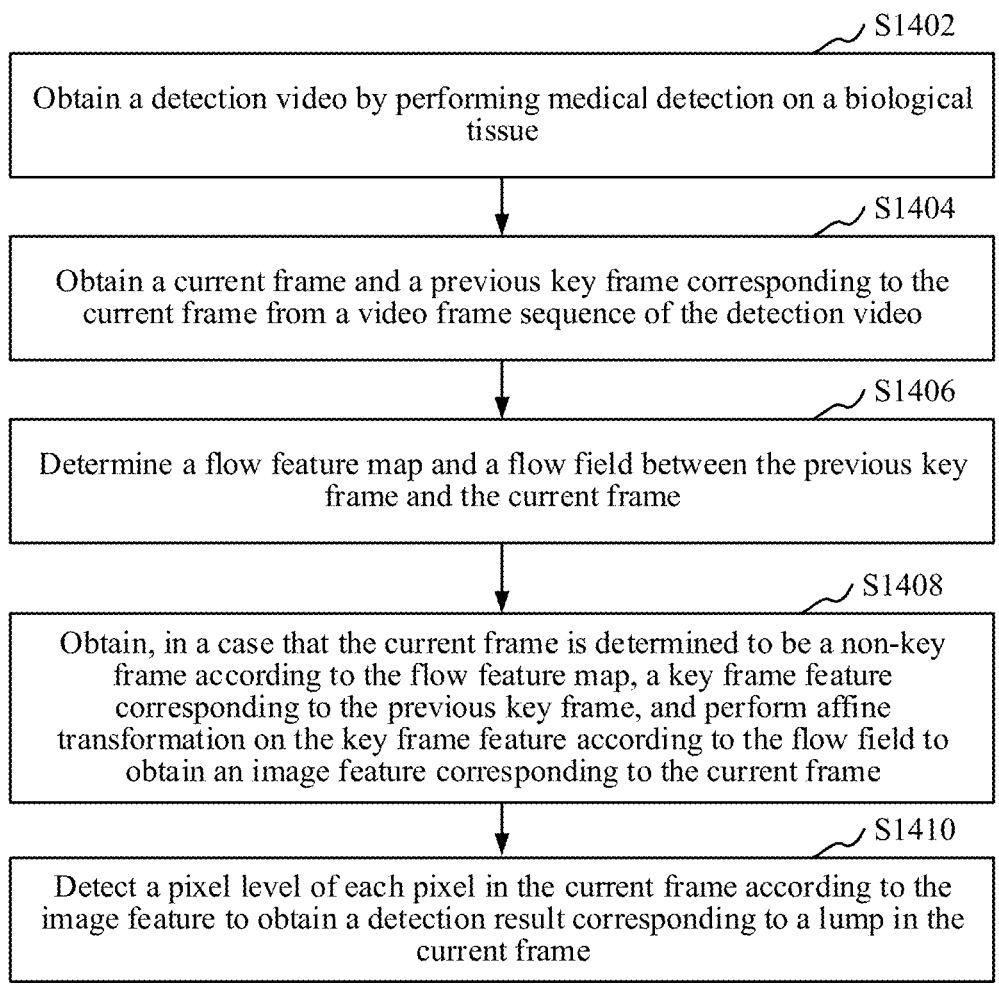
FIG. 14 is a schematic flowchart of a target detection method according to one or more embodiments of the present disclosure.

In an embodiment, as shown in FIG. 14, a target detection method is provided. In this embodiment, description is made mainly by using an example in which the method is appli-

TABLE 5

|  | ResNet152 | | | ResNet101 | | | ResNet50 | | |
| --- | --- | --- | --- | --- | --- | --- | --- | --- | --- |
|  | MAP | GPU (ms) | CPU (ms) | MAP | GPU (ms) | CPU (ms) | MAP | GPU (ms) | CPU (ms) |
| Related technology | 86.56 | 32 | 1548 | 86.78 | 26 | 1161 | 81.94 | 22 | 816 |
| Using the target detection method provided in the embodiments of the present disclosure | 78.81 | 16 | 451 | 74.63 | 16 | 452 | 73.22 | 73.22 | 450 |
| | 88.30 | 17 | 484 | 91.14 | 17 | 482 | 78.81 | 17 | 481 |
| | 88.63 | 19 | 589 | 89.68 | 19 | 547 | 89.02 | 19 | 540 |
| | 88.80 | 21 | 660 | 89.15 | 21 | 671 | 83.44 | 21 | 682 |
| | 86.91 | 24 | 832 | 87.22 | 23 | 853 | 82.17 | 23 | 833 |
| | 84.81 | 25 | 965 | 87.44 | 25 | 987 | 80.84 | 24 | 943 |

In the foregoing Table (5), the performance data includes a mean average precision (MAP) and a running time (with a unit being ms), and the running time includes a running time of the GPU and a running time of the CPU. The first column in Table (5) represents feature extraction models designed by using different network structures, including ResNet152, ResNet101, and ResNet50. Both from the related technology and from the target detection method provided in the embodiments of the present disclosure, the MAP and the running efficiency of the feature extraction model designed based on the ResNet50 network structure is better than that of the ResNet152 and ResNet101.

Then, according to row data corresponding to each network structure shown in Table (5), no matter which network structure, comparing the improved target detection method provided in the present disclosure with the related technology, it may be seen that, because the related technology directly performs feature extraction on each video frame in a video, not only the accuracy is not improved, but also motion change information between a previous key frame and a current frame is ignored, and therefore, an image feature of the current frame cannot be understood fully, thereby decreasing the accuracy (the MAP value is relatively large) and the running efficiency.

According to the target detection method provided in the embodiments of the present disclosure, there are six rows of data in total, and each row of data corresponds to different preset thresholds in the decision network. Obviously, when adopting the feature extraction models designed based on different network structures, adjusting the preset threshold has relatively small impact on the accuracy and the running efficiency of the entire method. It indicates that the target detection method provided in the present disclosure may be adapted to the feature extraction models designed based on a plurality of types of network structures, and a network structure of a feature extraction model may be selected according to the difficulty.

cable to a computing device 120 in FIG. 1. Referring to FIG. 14, the target detection method includes the following operations:

S1402. Obtain a detection video by performing medical detection on a biological tissue.

The biological tissue may be a part of the body, like the breast, the shoulder, or the abdomen. Performing medical detection on the biological tissue may be performing ultrasound examination or X-ray examination on the biological tissue. In certain embodiments, the computing device may obtain a detection video obtained by performing medical detection on the biological tissue by using an acquisition device.

S1404. Obtain a current frame and a previous key frame corresponding to the current frame from a video frame sequence of the detection video.

In certain embodiments, the computing device may process an order of each frame of image video frame of a detection video, to obtain a current frame and a corresponding previous key frame in a video frame sequence of the detection video. The current frame is a currently-processed video frame. The previous key frame corresponding to the current frame is a closest key frame before the current frame. When processing the video fame in the video frame sequence, the previous key frame may be updated into a latest key frame.

For specific implementation of step S1404, reference may be made to the embodiment described for step S202.

S1406. Determine a flow feature map and a flow field between the previous key frame and the current frame.

The pre-trained target detection model is a network model constructed based on a deep neural network. A model parameter of the target detection model has been trained, and therefore, the target detection model may be directly used to perform target detection on a detection video. In certain embodiments, the computing device may input an obtained current frame and a previous key frame corresponding to the current frame into a pre-trained target detection model, to calculate a flow field and a flow feature map between the current frame and the previous key frame by using the target detection model.

For specific implementation of step S1404, reference may be made to the embodiment described for step S204.

S1408. Obtain, when or in response to determining the current frame is a non-key frame according to the flow feature map, a key frame feature corresponding to the previous key frame, and perform affine transformation on the key frame feature according to the flow field to obtain an image feature corresponding to the current frame.

The key frame feature is obtained by performing feature extraction on the previous key frame, and is a space vector matrix that can represent frame information of the previous key frame. The image feature corresponding to the current frame is a space vector matrix that can represent frame information of the current frame. The affine transformation is a process of performing linear transformation on a space vector matrix and then performing translation transformation to obtain another space vector matrix. The linear transformation includes a convolution operation.

In certain embodiments, because the flow feature map represents a similarity between video frames, the computing device may determine a difference between the previous key frame and the current frame according to a flow feature map outputted by the flow network, and determine whether the current frame is a key frame according to the difference. When the current frame is a non-key frame, it indicates that the similarity between the current frame and the previous key frame is relatively higher, and the computing device may directly perform affine transformation according to the flow field and the key frame feature to obtain an image feature corresponding to the current frame, that is, transform, according to motion change information between the previous key frame and the current frame, the key frame feature into another feature as the image feature of the current frame.

By obtaining the image feature corresponding to the current frame by using affine transformation, a process of performing feature extraction on the current frame by using a feature extraction network is reduced or even eliminated, and a quantity of times of feature extraction is reduced, thereby improving the operation efficiency. Moreover, because the image feature refers to the key frame feature of the previous key frame and combines or integrates the motion change information with the previous key frame, compared with the feature that ignores the previous key frame due to direct feature extraction, the image feature can fully represent the feature of the current frame and improve the accuracy.

For specific implementation of step S1408, reference may be made to the embodiment described for step S206.

S1410. Perform target detection on the current frame according to the image feature to obtain a target detection result corresponding to the lump in the current frame.

The detection result may be a lump region formed by pixel belonging to the lump in the current frame, or may be a lump region detection box corresponding to the lump region, and the lump region detection box may be a smallest box surrounding the lump region. In certain embodiments, after the image feature corresponding to the current frame is obtained through the processing of the target detection model, the computing device may perform target detection of pixel level on the current frame, that is, detect a pixel level of each pixel in the current frame based on the image feature of the current frame, to output a detection result corresponding to the lump in the current frame.

For specific implementation of step S1410, reference may be made to the embodiment described for step S208.

In an embodiment, the foregoing target detection method further includes: performing, when or in response to determining the current frame is a key frame according to the flow feature map, feature extraction on the current frame by using a pre-trained feature extraction model to obtain a corresponding image feature, updating the previous key frame according to the current frame, and updating the key frame feature corresponding to the previous key frame according to the image feature.

In an embodiment, the determining a flow feature map and a flow field between the previous key frame and the current frame includes: superimposing the previous key frame and the current frame to obtain a synthesized image; inputting the synthesized image into a flow network of a pre-trained target detection model; performing a convolution operation on the synthesized image by using a downsampling module of the flow network to obtain the flow feature map between the previous key frame and the current frame; and performing a deconvolution operation on the flow feature map by using an upsampling module of the flow network to obtain the flow field between the previous key frame and the current frame.

In an embodiment, the foregoing target detection method further includes: inputting the flow feature map into a decision network of a pre-trained target detection model; performing a convolution operation on the flow feature map by using the decision network to output a difference between the previous key frame and the current frame; determining the current frame to be a key frame when or in response to determining the difference is greater than or equal to a preset threshold; and determining the current frame to be a non-key frame when or in response to determining the difference is less than the preset threshold.

In an embodiment, the obtaining a key frame feature corresponding to the previous key frame, and performing affine transformation on the key frame feature according to the flow field to obtain an image feature corresponding to the current frame includes: obtaining a key frame feature corresponding to the previous key frame; inputting the key frame feature and the flow field into an affine network of a pre-trained target detection model; and performing a convolution operation on the flow field by using the affine network to obtain a flow field having the same size as the key frame feature, and connecting the key frame feature to the flow field having the same size to obtain the image feature corresponding to the current frame.

In an embodiment, the performing target detection on the current frame according to the image feature to obtain a target detection result corresponding to the lump in the current frame includes: inputting the image feature corresponding to the current frame into a pixel level classifier; performing pixel level prediction on the image feature by using a hidden layer of the pixel level classifier to obtain a pixel level of each pixel in the current frame; and outputting a detection result corresponding to the lump in the current frame according to the pixel level of each pixel in the current frame.

In an embodiment, the foregoing target detection method further includes: performing, when or in response to determining the current frame is an initial video frame in the video frame sequence, feature extraction on the initial video frame by using a pre-trained feature extraction model to obtain a corresponding image feature, using the initial video frame as the previous key frame, and using the image feature as the key frame feature corresponding to the previous key frame.

In an embodiment, a target detection model includes a flow network, a decision network, and an affine network, and operations of training the target detection model includes: obtaining a plurality of pairs of video frame groups, each pair of video frame groups including a first video frame and a second video frame, the first video frame and the second video frame being any two video frames in the same video, and the first video frame being before the second video frame in the video; inputting the video frame group into the flow network, and outputting the flow feature map and the flow field between the first video frame and the second video frame by using the flow network; inputting an image feature corresponding to the first video frame and the flow field into the affine network, and outputting a fake image feature corresponding to the second video frame by using the affine network. calculating a first loss according to the image feature and the fake image feature corresponding to the second video frame; inputting the flow feature map into the decision network, and outputting a difference between the first video frame and the second video frame by using the decision network; calculating a second loss according to the difference and the first loss; fusing the first loss and the second loss to obtain a loss value of the target detection model; and adjusting a model parameter of the target detection model according to the loss value, returning to the operation of inputting the video frame group into the flow network and outputting the flow feature map and the flow field between the previous key frame and the current frame by using the flow network to continue the training until a training stop condition is met.

In an embodiment, the foregoing target detection method further includes: inputting the first video frame into the pre-trained feature extraction model, and performing an operation on the first video frame by using the feature extraction model to output the image feature corresponding to the first video frame; and inputting the second video frame into the pre-trained feature extraction model, and performing an operation on the second video frame by using the feature extraction model to output the image feature corresponding to the second video frame.

In an embodiment, the foregoing target detection method further includes: obtaining a lump detection image sample set, each lump detection image sample in the lump detection image sample set is marked with a corresponding true detection box; inputting the lump detection image sample into a feature extraction model for training, to obtain a predicted detection box corresponding to the target included in the lump detection image sample; constructing a loss function according to the true detection box and the predicted detection box; and adjusting a model parameter of the feature extraction model according to the loss function, obtaining a next lump detection image sample from the lump detection image sample set, and returning to the operation of inputting the lump detection image sample into the feature extraction model for training to continue the training until a training stop condition is met.

For a specific implementation of the foregoing embodiment, reference may be made to the above described embodiments.

According to the target detection method, a flow feature map and a flow field between a current frame and a corresponding previous key frame are extracted, the flow feature map may represent a similarity between the current frame and the previous key frame, and the flow field may represent motion change information of the current frame relative to the previous key frame. When the current frame is determined to be a non-key frame according to the flow feature map, it indicates that the similarity between the current frame and the previous key frame is relatively high, and affine transformation may be performed on a key frame feature corresponding to the previous key frame according to the flow field to obtain an image feature corresponding to the current frame without feature extraction, which reduces the times of the feature extraction and so as to reduce the calculation amount, thereby improving the detection efficiency of performing target detection on a video.

Moreover, the image feature can not only retain information about the previous key frame, but also have a feature of the current frame because of the flow field, and therefore, a detection box corresponding to a lump in a video frame obtained by performing target detection of pixel level based on the image feature has higher accuracy. Especially, in some case, a lump in a detection video hides to a muscle layer in a video frame. In this case, a feature of the lump in the video frame is not obvious, and if feature extraction is directly performed on the video frame, the obtained image feature is not accurate enough, and therefore, a detection box corresponding to the lump cannot be found in the video frame.

Figure 15:
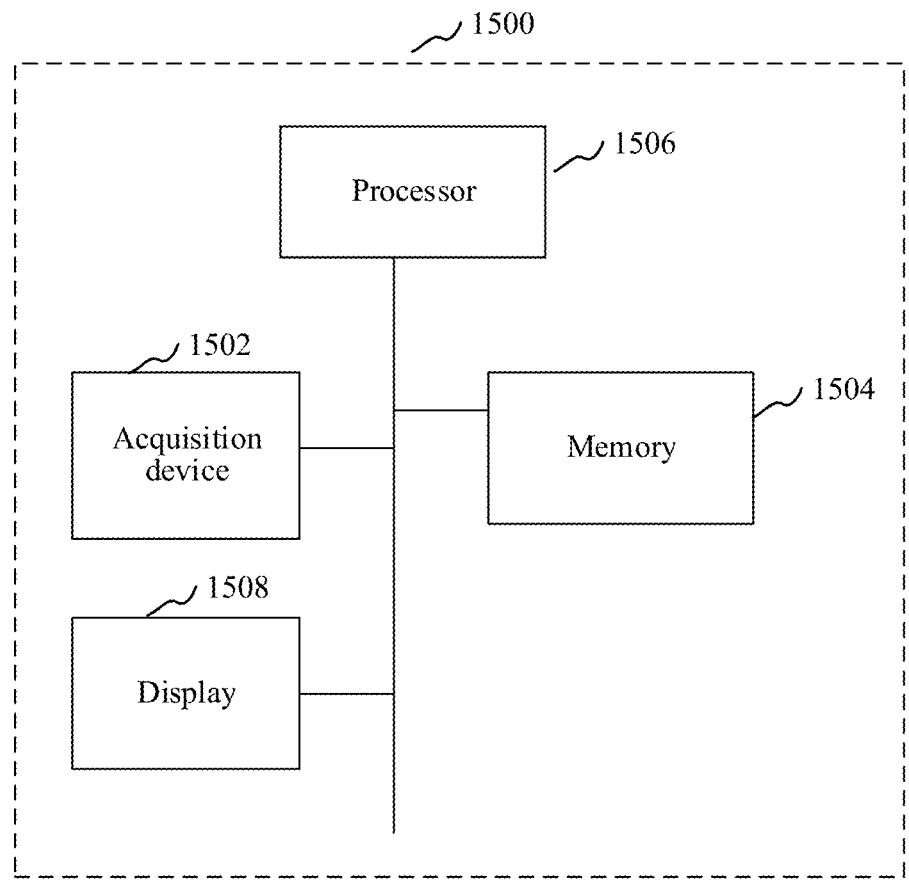
FIG. 15 is a schematic block diagram of a target detection system according to one or more embodiments of the present disclosure.

As shown in FIG. 15, an embodiment of the present disclosure further provides a target detection system 1500, including: an acquisition device 1502, configured to detect a biological tissue to obtain a detection video; a memory 1504, the memory storing computer-readable instructions; a processor 1506, the computer-readable instructions, when executed by the processor 1506, causing the processor 1506 to perform the following operations: obtaining a current frame and a previous key frame corresponding to the current frame from a video frame sequence of a detection video; determining a flow feature map and a flow field between the previous key frame and the current frame; obtaining, when or in response to determining the current frame is a non-key frame according to the flow feature map, a key frame feature corresponding to the previous key frame, and performing affine transformation on the key frame feature according to the flow field to obtain an image feature corresponding to the current frame; and performing target detection on the current frame according to the image feature to determine a target detection result of the current frame; and a display 1508, configured to display a detection box corresponding to a target in the current frame according to the target detection result.

In an embodiment, when executed by the processor 1506, the computer-readable instructions cause the processor 1506 to further perform the following operation: performing, when or in response to determining the current frame is a key frame according to the flow feature map, feature extraction on the current frame by using a pre-trained feature extraction model to obtain a corresponding image feature, updating the previous key frame according to the current frame, and updating the key frame feature corresponding to the previous key frame according to the image feature.

In an embodiment, when executed by the processor 1506 to perform the operation of determining a flow feature map and a flow field between the previous key frame and the current frame, the computer-readable instructions cause the processor 1506 to further perform the following operations: superimposing the previous key frame and the current frame to obtain a synthesized image; inputting the synthesized image into a flow network of a pre-trained target detection model; performing a convolution operation on the synthesized image by using a downsampling module of the flow network to obtain the flow feature map between the previous key frame and the current frame; and performing a deconvolution operation on the flow feature map by using an upsampling module of the flow network to obtain the flow field between the previous key frame and the current frame.

In an embodiment, when executed by the processor 1506, the computer-readable instructions cause the processor 1506 to further perform the following operations: inputting the flow feature map into a decision network of a pre-trained target detection model; performing a convolution operation on the flow feature map by using the decision network to output a difference between the previous key frame and the current frame; determining the current frame to be a key frame when or in response to determining the difference is greater than or equal to a preset threshold; and determining the current frame to be a non-key frame when or in response to determining the difference is less than the preset threshold.

In an embodiment, when executed by the processor 1506 to perform the operation of obtaining a key frame feature corresponding to the previous key frame, and performing affine transformation on the key frame feature according to the flow field to obtain an image feature corresponding to the current frame, the computer-readable instructions cause the processor 1506 to further perform the following operations: obtaining a key frame feature corresponding to the previous key frame; inputting the key frame feature and the flow field into an affine network of a pre-trained target detection model; and performing a convolution operation on the flow field by using the affine network to obtain a flow field having the same size as the key frame feature, and connecting the key frame feature to the flow field having the same size to obtain the image feature corresponding to the current frame.

In an embodiment, when executed by the processor 1506 to perform the operation of detecting a pixel level of each pixel in the current frame according to the image feature to obtain a target detection result of the current frame, the computer-readable instructions cause the processor 1506 to further perform the following operations: inputting the image feature corresponding to the current frame into a pixel level classifier; performing pixel level prediction on the image feature by using a hidden layer of the pixel level classifier to obtain a pixel level of each pixel in the current frame; and outputting the target detection result of the current frame according to the pixel level of each pixel in the current frame.

In an embodiment, when executed by the processor 1506, the computer-readable instructions cause the processor 1506 to further perform the following operation: performing, when or in response to determining the current frame is an initial video frame in the video frame sequence, feature extraction on the initial video frame by using a pre-trained feature extraction model to obtain a corresponding image feature, using the initial video frame as the previous key frame, and using the image feature as the key frame feature corresponding to the previous key frame.

In an embodiment, the target detection model includes a flow network, a decision network, and an affine network. When executed by the processor 1506, the computer-readable instructions cause the processor 1506 to further perform the following operations: obtaining a plurality of pairs of video frame groups, each pair of video frame groups including a first video frame and a second video frame, the first video frame and the second video frame being any two video frames in the same video, and the first video frame being before the second video frame in the video; inputting the video frame group into the flow network, and outputting the flow feature map and the flow field between the first video frame and the second video frame by using the flow network; inputting an image feature corresponding to the first video frame and the flow field into the affine network, and outputting a fake image feature corresponding to the second video frame by using the affine network. calculating a first loss according to the image feature and the fake image feature corresponding to the second video frame; inputting the flow feature map into the decision network, and outputting a difference between the first video frame and the second video frame by using the decision network; calculating a second loss according to the difference and the first loss; fusing the first loss and the second loss to obtain a loss value of the target detection model; and adjusting a model parameter of the target detection model according to the loss value, returning to the operation of inputting the video frame group into the flow network and outputting the flow feature map and the flow field between the previous key frame and the current frame by using the flow network to continue the training until a training stop condition is met.

In an embodiment, when executed by the processor 1506, the computer-readable instructions cause the processor 1506 to further perform the following operations: inputting the first video frame into the pre-trained feature extraction model, and performing an operation on the first video frame by using the feature extraction model to output the image feature corresponding to the first video frame; and inputting the second video frame into the pre-trained feature extraction model, and performing an operation on the second video frame by using the feature extraction model to output the image feature corresponding to the second video frame.

In an embodiment, when executed by the processor 1506, the computer-readable instructions cause the processor 1506 to further perform the following operations: obtaining a lump detection image sample set, each lump detection image sample in the lump detection image sample set is marked with a true detection box; inputting the lump detection image sample into a feature extraction model for training, to obtain a predicted detection box corresponding to the target included in the lump detection image sample; constructing a loss function according to the true detection box and the predicted detection box; and adjusting a model parameter of the feature extraction model according to the loss function, obtaining a next lump detection image sample from the lump detection image sample set, and returning to the operation of inputting the lump detection image sample into the feature extraction model for training to continue the training until a training stop condition is met.

According to the target detection system 1500, a flow feature map and a flow field between a current frame and a corresponding previous key frame are extracted, the flow feature map may represent a similarity between the current frame and the previous key frame, and the flow field may represent motion change information of the current frame relative to the previous key frame. When the current frame is determined to be a non-key frame according to the flow feature map, it indicates that the similarity between the current frame and the previous key frame is relatively high, and affine transformation may be performed on a key frame feature corresponding to the previous key frame according to the flow field to obtain an image feature corresponding to the current frame without feature extraction, which reduces the times of the feature extraction and so as to reduce the calculation amount, thereby improving the detection efficiency of performing target detection on a video. Moreover, the image feature not only retains information about the previous key frame, but also has a feature of the current frame because of the flow field, and therefore, the target detection result obtained by performing detection on the pixel level of each pixel in the current frame based on the image feature has higher accuracy.

Figure 16:
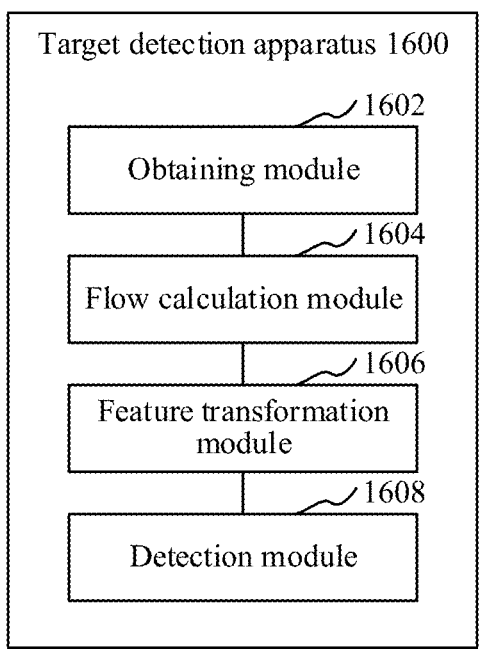
FIG. 16 is a schematic block diagram of a target detection apparatus according to one or more embodiments of the present disclosure.

In an embodiment, as shown in FIG. 16, a target detection apparatus 1600 is provided. The apparatus includes an obtaining module 1602, a flow calculation module 1604, a feature transformation module 1606, and a detection module 1608, where the obtaining module 1602 is configured to obtain a current frame and a previous key frame corresponding to the current frame in a video frame sequence; the flow calculation module 1604 is configured to determine a flow feature map and a flow field between the previous key frame and the current frame; the feature transformation module 1606 is configured to obtain, when or in response to determining the current frame is a non-key frame according to the flow feature map, a key frame feature corresponding to the previous key frame, and perform affine transformation on the key frame feature according to the flow field to obtain an image feature corresponding to the current frame; and the detection module 1608 is configured to perform target detection on the current frame according to the image feature to determine a target detection result of the current frame.

In an embodiment, the foregoing target detection apparatus 1600 further includes a feature extraction module.

The feature extraction module is configured to perform, when or in response to determining the current frame is a key frame according to the flow feature map, feature extraction on the current frame by using a pre-trained feature extraction model to obtain a corresponding image feature; and updating the previous key frame according to the current frame, and updating the key frame feature corresponding to the previous key frame according to the image feature.

In an embodiment, the flow calculation module 1604 is configured to: superimpose the previous key frame and the current frame to obtain a synthesized image; input the synthesized image into a flow network of a pre-trained target detection model; perform a convolution operation on the synthesized image by using a downsampling module of the flow network to obtain the flow feature map between the previous key frame and the current frame; and perform a deconvolution operation on the flow feature map by using an upsampling module of the flow network to obtain the flow field between the previous key frame and the current frame.

In an embodiment, the foregoing target detection apparatus 1600 further includes a determining module.

The determining module is configured to input the flow feature map into a decision network of a pre-trained target detection model; perform a convolution operation on the flow feature map by using the decision network to output a difference between the previous key frame and the current frame; determine the current frame to be a key frame when or in response to determining the difference is greater than or equal to a preset threshold; and determine the current frame to be a non-key frame when or in response to determining the difference is less than the preset threshold.

In an embodiment, the feature transformation module 1606 is configured to: obtain a key frame feature corresponding to the previous key frame; input the key frame feature and the flow field into an affine network of a pre-trained target detection model; and perform a convolution operation on the flow field by using the affine network to obtain a flow field having the same size as the key frame feature, and connect the key frame feature to the flow field having the same size to obtain an image feature corresponding to the current frame.

In an embodiment, the detection module 1608 is configured to: input the image feature corresponding to the current frame into a pixel level classifier; perform pixel level prediction on the image feature by using a hidden layer of the pixel level classifier to obtain a pixel level of each pixel in the current frame; and determine a target detection result of the current frame according to the pixel level of each pixel in the current frame.

In an embodiment, the feature extraction module is further configured to: perform, when or in response to determining the current frame is an initial video frame in the video frame sequence, feature extraction on the initial video frame by using a pre-trained feature extraction model to obtain a corresponding image feature, use the initial video frame as the previous key frame, and using the image feature as the key frame feature corresponding to the previous key frame.

In an embodiment, the target detection model includes a flow network, a decision network, and an affine network. The foregoing target detection apparatus 1600 further includes a training module.

The training module is configured to obtain a plurality of pairs of video frame groups, each pair of video frame groups including a first video frame and a second video frame, the first video frame and the second video frame being any two video frames in the same video, and the first video frame being before the second video frame in the video; input the video frame group into the flow network, and output the flow feature map and the flow field between the first video frame and the second video frame by using the flow network; input an image feature corresponding to the first video frame and the flow field into the affine network, and output a fake image feature corresponding to the second video frame by using the affine network. calculate a first loss according to the image feature and the fake image feature corresponding to the second video frame; input the flow feature map into the decision network, and output a difference between the first video frame and the second video frame by using the decision network; calculate a second loss according to the difference and the first loss; fuse the first loss and the second loss to obtain a loss value of the target detection model; and adjust a model parameter of the target detection model according to the loss value, return to the operation of inputting the video frame group into the flow network and output the flow feature map and the flow field between the previous key frame and the current frame by using the flow network to continue the training until a training stop condition is met.

In an embodiment, the foregoing feature extraction module is further configured to: input the first video frame into the pre-trained feature extraction model, and performing an operation on the first video frame by using the feature extraction model to output the image feature corresponding to the first video frame; and input the second video frame into the pre-trained feature extraction model, and perform an operation on the second video frame by using the feature extraction model to output the image feature corresponding to the second video frame.

According to the target detection apparatus 1600, a flow feature map and a flow field between a current frame and a corresponding previous key frame are extracted, the flow feature map may represent a similarity between the current frame and the previous key frame, and the flow field may represent motion change information of the current frame relative to the previous key frame. When the current frame is determined to be a non-key frame according to the flow feature map, it indicates that the similarity between the current frame and the previous key frame is relatively high, and affine transformation may be performed on a key frame feature corresponding to the previous key frame according to the flow field to obtain an image feature corresponding to the current frame without feature extraction, which reduces the times of the feature extraction and so as to reduce the calculation amount, thereby improving the detection efficiency of performing target detection on a video. Moreover, the image feature not only retains information about the previous key frame, but also has a feature of the current frame because of the flow field, and therefore, the target detection result obtained by performing target detection on the current frame based on the image feature has higher accuracy.

Figure 17:
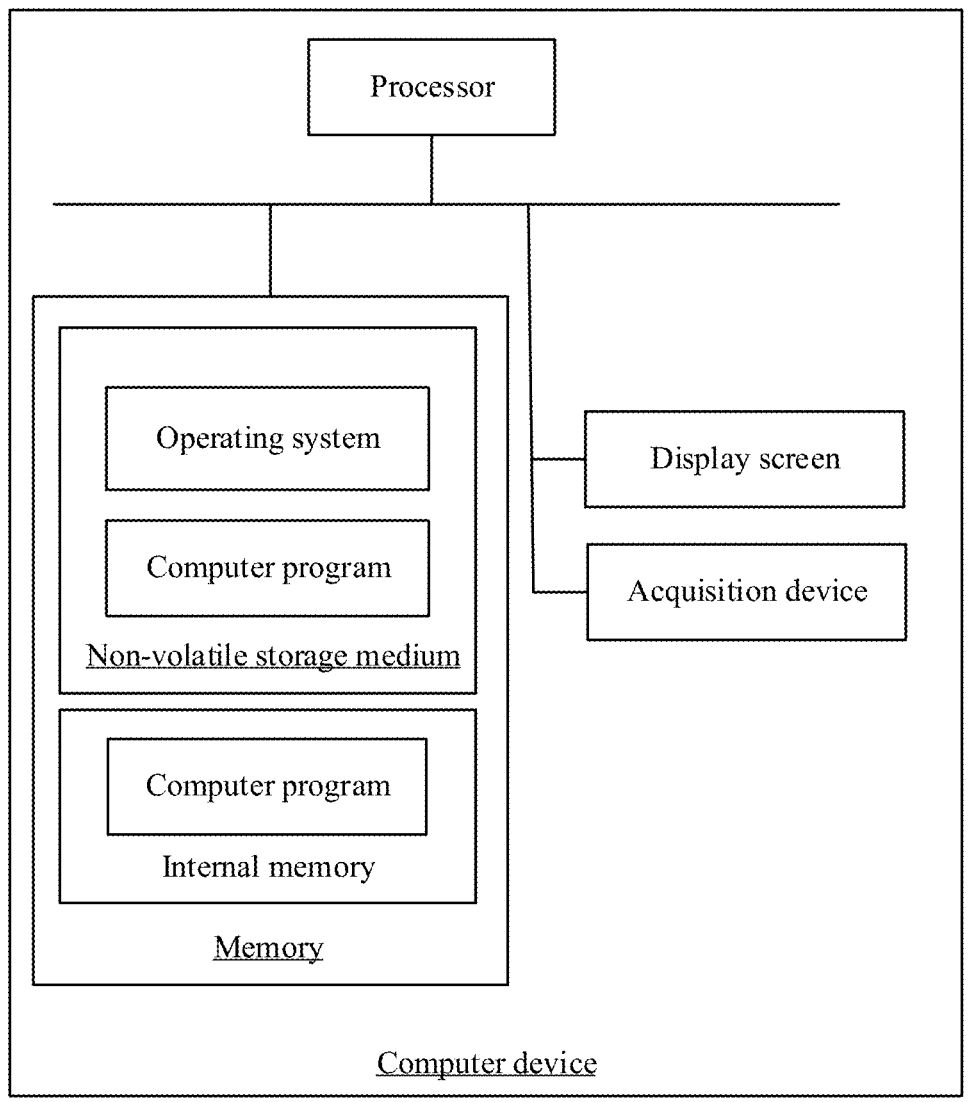
FIG. 17 is a schematic structural block diagram of a computing device according to one or more embodiments of the present disclosure.

FIG. 17 is a diagram of an internal structure of a computing device in an embodiment. The computing device may be the computing device 120 shown in FIG. 1. As shown in FIG. 17, the computing device includes a processor, a memory, an acquisition device, and a display screen that are connected by a system bus. The memory includes a non-volatile storage medium and an internal memory. The non-volatile storage medium of the computing device stores an operating system and may further store a computer program. The computer program, when executed by the processor, may cause the processor to implement the target detection method. The internal memory may also store a computer program. The computer program, when executed by the processor, may cause the processor to perform the target detection method. The display screen of the computing device may be a liquid crystal display screen or an electronic ink display screen. The acquisition device of the computing device may be an ultrasonic probe or an X-ray probe.

A person skilled in the art may understand that, the structure shown in FIG. 17 is only a block diagram of a part of a structure related to a solution of the present disclosure and does not limit the computing device to which the solution of the present disclosure is applied. In certain embodiments, the computing device may include more or fewer components than those in the drawings, or include a combination of some components, or include different component layouts.

In an embodiment, the target detection apparatus 1600 provided in the present disclosure may be implemented in the form of a computer program. The computer program may run on the computing device shown in FIG. 17. The memory of the computing device may store program modules forming the target detection apparatus 1600, for example, the obtaining module 1602, the flow calculation module 1604, the feature transformation module 1606, and the detection module 1608 shown in FIG. 16. The computer program formed by the program modules causes the processor to perform the operations in the target detection method in the embodiments of the present disclosure described in the present disclosure.

For example, the computing device shown in FIG. 17 may perform step S202 by using the obtaining module 1602 in the target detection apparatus 1600 shown in FIG. 16. The computing device may perform step S204 by using the flow calculation module 1604. The computing device may perform step S206 by using the feature transformation module 1606. The computing device may perform step S208 by using the detection module 1608.

In another example, the computing device shown in FIG. 17 may perform step S1304 by using the obtaining module 1602 in the target detection apparatus 1600 shown in FIG. 16. The computing device may perform step S1306 by using the flow calculation module 1604. The computing device may perform step S1308 by using the feature transformation module 1606. The computing device may perform step S1310 by using the detection module 1608.

In an embodiment, a computing device is provided, including a processor and a memory. The memory stores a computer program, the computer program, when executed by the processor, causing the processor to perform the operation of the foregoing target detection method. Herein, the operations of the target detection method may be the operations of the target detection method in the foregoing embodiments.

In an embodiment, a computer-readable storage medium is provided, storing a computer program, the computer program, when being executed by a processor, causing the processor to perform the operations of the foregoing target detection method. Herein, the operations of the target detection method may be the operations of the target detection method in the foregoing embodiments.

A person of ordinary skill in the art may understand that all or some of procedures of the method in the foregoing embodiments may be implemented by a computer program instructing relevant hardware. The program may be stored in a non-volatile computer-readable storage medium. When the program is executed, the procedures of the foregoing method embodiments may be implemented. References to the memory, the storage, the database, or other medium used in the embodiments provided in the present disclosure may all include a non-volatile or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external high-speed cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink (Synchlink) DRAM (SLDRAM), a rambus (Rambus) direct RAM (RDRAM), a direct rambus dynamic RAM (DRDRAM), and a rambus dynamic RAM (RDRAM).

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Technical features of the foregoing embodiments may be randomly combined or integrated. To make description concise, not all possible combinations of the technical features in the foregoing embodiments are described. However, the combinations of these technical features shall be considered as falling within the scope recorded by the present disclosure provided that no conflict exists.

The foregoing embodiments only show several implementations of the present disclosure, and descriptions thereof are in detail, but cannot be understood as a limitation to the patent scope of the present disclosure. For a person of ordinary skill in the art, several transformations and improvements can be made without departing from the idea of the present disclosure. These transformations and improvements belong to the protection scope of the present disclosure. Therefore, the protection scope of the patent of the present disclosure shall be subject to the appended claims.

What is claimed is:

1. A target detection method, performed by a computing device, the method comprising:
   obtaining a current frame and a previous key frame corresponding to the current frame in a video frame sequence;
   determining a flow feature map and a flow field between the previous key frame and the current frame;
   performing, in response to determining that the current frame is a key frame according to the flow feature map, feature extraction on the current frame to obtain an image feature corresponding to the current frame, updating the previous key frame according to the current frame, and updating a key frame feature corresponding to the previous key frame according to the image feature;
   obtaining, in response to determining that the current frame is a non-key frame according to the flow feature map, the key frame feature corresponding to the previous key frame, and performing affine transformation on the key frame feature according to the flow field to obtain the image feature corresponding to the current frame; and
   performing target detection on the current frame according to the image feature to determine a target detection result of the current frame.

2. The method according to claim 1, wherein:
   in response to determining the current frame is the key frame according to the flow feature map, the feature extraction on the current frame is performed by using a pre-trained feature extraction model to obtain the image feature.

3. The method according to claim 1, wherein the determining the flow feature map and the flow field comprises:
   superimposing the previous key frame and the current frame to obtain a synthesized image;
   inputting the synthesized image into a flow network of a pre-trained target detection model;
   performing a convolution operation on the synthesized image by using a downsampling module of the flow network to obtain the flow feature map between the previous key frame and the current frame; and
   performing a deconvolution operation on the flow feature map by using an upsampling module of the flow network to obtain the flow field between the previous key frame and the current frame.

4. The method according to claim 1, further comprising:
   inputting the flow feature map into a decision network of a pre-trained target detection model;
   performing a convolution operation on the flow feature map by using the decision network to obtain a difference between the previous key frame and the current frame;
   determining the current frame to be a key frame in response to determining the difference is greater than or equal to a preset threshold; and
   determining the current frame to be a non-key frame in response to determining the difference is less than the preset threshold.

5. The method according to claim 1, wherein the performing affine transformation on the key frame feature comprises:
   inputting the key frame feature and the flow field into an affine network of a pre-trained target detection model; and
   performing a convolution operation on the flow field by using the affine network to obtain a flow field having the same size as the key frame feature, and connecting the key frame feature to the flow field having the same size to obtain the image feature corresponding to the current frame.

6. The method according to claim 1, wherein the performing target detection on the current frame comprises:
   inputting the image feature into a pixel level classifier;
   performing pixel level prediction on the image feature by using a hidden layer of the pixel level classifier to obtain a pixel level of each pixel in the current frame; and
   determining the target detection result of the current frame according to the pixel level of each pixel in the current frame.

7. The method according to claim 1, further comprising:
   performing, in response to determining the current frame is an initial video frame in the video frame sequence, feature extraction on the initial video frame by using a pre-trained feature extraction model to obtain a corresponding image feature; and using the initial video frame as the previous key frame, and using the image feature as the key frame feature corresponding to the previous key frame.

8. The method according to claim 1, wherein the flow feature map and the flow field are obtained by using processing by a flow network in a target detection model, the target detection model further includes the decision network and the affine network, and the target detection model is trained by:
   obtaining a plurality of pairs of video frame groups, each pair of video frame groups comprising a first video frame and a second video frame, the first video frame and the second video frame being any two video frames in the same video, and the first video frame being before the second video frame in the video;
   inputting the video frame group into the flow network, and outputting the flow feature map and the flow field between the first video frame and the second video frame by using the flow network;
   inputting an image feature corresponding to the first video frame and the flow field into the affine network, and outputting a fake image feature corresponding to the second video frame by using the affine network; calculating a first loss according to an image feature corresponding to the second video frame and the fake image feature;
   inputting the flow feature map into the decision network, and outputting a difference between the first video frame and the second video frame by using the decision network; and calculating a second loss according to the difference and the first loss;
   fusing the first loss and the second loss to obtain a loss value of the target detection model; and
   adjusting a model parameter of the target detection model according to the loss value, returning to the operation of inputting the video frame group into the flow network, and outputting the flow feature map and the flow field between the first video frame and the second video frame by using the flow network to continue the training until a training stop condition is met.

9. The method according to claim 8, further comprising:
inputting the first video frame into the pre-trained feature extraction model, and performing an operation on the first video frame by using the feature extraction model to output the image feature corresponding to the first video frame; and
inputting the second video frame into the pre-trained feature extraction model, and performing an operation on the second video frame by using the feature extraction model to output the image feature corresponding to the second video frame.

10. A target detection system, comprising: a target detection apparatus, wherein the target detection apparatus includes at least one memory storing computer program instructions and at least one processor coupled to the at least one memory and configured to execute the computer program instructions and perform:
obtaining a current frame and a previous key frame corresponding to the current frame in a video frame sequence of a detection video;
determining a flow feature map and a flow field between the previous key frame and the current frame;
performing, in response to determining that the current frame is a key frame according to the flow feature map, feature extraction on the current frame to obtain an image feature corresponding to the current frame, updating the previous key frame according to the current frame, and updating a key frame feature corresponding to the previous key frame according to the image feature;
obtaining, in response to determining that the current frame is a non-key frame according to the flow feature map, the key frame feature corresponding to the previous key frame, and performing affine transformation on the key frame feature according to the flow field to obtain the image feature corresponding to the current frame; and
performing target detection on the current frame according to the image feature to determine a target detection result of the current frame.

11. The system according to claim 10, wherein
in response to determining the current frame is the key frame according to the flow feature map, the feature extraction on the current frame is performed by using a pre-trained feature extraction model to obtain the image feature.

12. The system according to claim 10, wherein the at least one processor is configured to execute the computer program instructions and further perform:
superimposing the previous key frame and the current frame to obtain a synthesized image;
inputting the synthesized image into a flow network of a pre-trained target detection model;
performing a convolution operation on the synthesized image by using a downsampling module of the flow network to obtain the flow feature map between the previous key frame and the current frame; and
performing a deconvolution operation on the flow feature map by using an upsampling module of the flow network to obtain the flow field between the previous key frame and the current frame.

13. The system according to claim 10, wherein the at least one processor is configured to execute the computer program instructions and further perform:

inputting the flow feature map into a decision network of a pre-trained target detection model;
performing a convolution operation on the flow feature map by using the decision network to obtain a difference between the previous key frame and the current frame;
determining the current frame to be a key frame in response to determining the difference is greater than or equal to a preset threshold; and
determining the current frame to be a non-key frame in response to determining the difference is less than the preset threshold.

14. The system according to claim 10, wherein the at least one processor is configured to execute the computer program instructions and further perform:
inputting the key frame feature and the flow field into an affine network of a pre-trained target detection model; and
performing a convolution operation on the flow field by using the affine network to obtain a flow field having the same size as the key frame feature, and connect the key frame feature to the flow field having the same size to obtain the image feature corresponding to the current frame.

15. The system according to claim 10, wherein the at least one processor is configured to execute the computer program instructions and further perform:
inputting the image feature into a pixel level classifier;
performing pixel level prediction on the image feature by using a hidden layer of the pixel level classifier to obtain a pixel level of each pixel in the current frame; and
determining a target detection result of the current frame according to the pixel level of each pixel in the current frame.

16. The system according to claim 10, wherein the at least one processor is configured to execute the computer program instructions and further perform:
performing, in response to determining the current frame is an initial video frame in the video frame sequence, feature extraction on the initial video frame by using a pre-trained feature extraction model to obtain a corresponding image feature; and use the initial video frame as the previous key frame, and use the image feature as the key frame feature corresponding to the previous key frame.

17. The system according to claim 10, wherein the flow feature map and the flow field are obtained by using processing of the flow network in the target detection model, the target detection model further includes the decision network and the affine network, and the at least one processor is configured to execute the computer program instructions and further perform:
obtaining a plurality of pairs of video frame groups, each pair of video frame groups comprising a first video frame and a second video frame, the first video frame and the second video frame being any two video frames in the same video, and the first video frame being before the second video frame in the video;
inputting the video frame group into the flow network, and output the flow feature map and the flow field between the first video frame and the second video frame by using the flow network;
inputting an image feature corresponding to the first video frame and the flow field into the affine network, and outputting a fake image feature corresponding to the second video frame by using the affine network; calculating a first loss according to an image feature corresponding to the second video frame and the fake image feature;

inputting the flow feature map into the decision network, and outputting a difference between the first video frame and the second video frame by using the decision network; and calculating a second loss according to the difference and the first loss;

fusing the first loss and the second loss to obtain a loss value of the target detection model; and adjusting a model parameter of the target detection model according to the loss value, return to the operation of inputting the video frame group into the flow network and outputting the flow feature map and the flow field between the first video frame and the second video frame by using the flow network to continue the training until a training stop condition is met.

18. The system according to claim 17, wherein the at least one processor is configured to execute the computer program instructions and further perform:

inputting the first video frame into the pre-trained feature extraction model, and perform an operation on the first video frame by using the feature extraction model to output the image feature corresponding to the first video frame; and inputting the second video frame into the pre-trained feature extraction model, and perform an operation on the second video frame by using the feature extraction model to output the image feature corresponding to the second video frame.

19. The system according to claim 10, further comprising:

an acquisition device for detecting a biological tissue to obtain the detection video; and a display for displaying a detection box corresponding to a target in the current frame according to the target detection result.

20. A non-transitory computer-readable storage medium storing computer program instructions executable by at least one processor to perform:

obtaining a current frame and a previous key frame corresponding to the current frame in a video frame sequence;

determining a flow feature map and a flow field between the previous key frame and the current frame;

performing, in response to determining that the current frame is a key frame according to the flow feature map, feature extraction on the current frame to obtain an image feature corresponding to the current frame, updating the previous key frame according to the current frame, and updating a key frame feature corresponding to the previous key frame according to the image feature;

obtaining, in response to determining that the current frame is a non-key frame according to the flow feature map, the key frame feature corresponding to the previous key frame, and performing affine transformation on the key frame feature according to the flow field to obtain the image feature corresponding to the current frame; and performing target detection on the current frame according to the image feature to determine a target detection result of the current frame.

* * * * *